US008650494B1

(12) United States Patent
Sampath et al.

(10) Patent No.: US 8,650,494 B1
(45) Date of Patent: Feb. 11, 2014

(54) REMOTE CONTROL OF A COMPUTING DEVICE

(75) Inventors: Satish Kumar Sampath, London (GB); Bjorn Bringert, Bath (GB)

(73) Assignee: Google Inc., Mountain View, CA (US)

( * ) Notice: Subject to any disclaimer, the term of this patent is extended or adjusted under 35 U.S.C. 154(b) by 640 days.

(21) Appl. No.: 12/751,615

(22) Filed: Mar. 31, 2010

(51) Int. Cl.
*G06F 3/01* (2006.01)
*G06F 15/16* (2006.01)

(52) U.S. Cl.
USPC .......................................... 715/740; 715/760

(58) Field of Classification Search
USPC ................................................. 715/740, 760
See application file for complete search history.

(56) References Cited

U.S. PATENT DOCUMENTS

| | | | |
|---|---|---|---|
| 5,801,689 | A | 9/1998 | Huntsman |
| 5,949,412 | A | 9/1999 | Huntsman |
| 6,725,238 | B1 | 4/2004 | Auvenshine |
| 2010/0031196 | A1* | 2/2010 | Ordody et al. ................ 715/810 |
| 2010/0269048 | A1 | 10/2010 | Pahlavan et al. |
| 2010/0269152 | A1* | 10/2010 | Pahlavan et al. .................. 726/3 |
| 2011/0138314 | A1* | 6/2011 | Mir et al. ....................... 715/779 |

OTHER PUBLICATIONS

"HTML5: A vocabulary and associated APIs for HTML and XHTML", W3C Publications, Editor's Draft, Dec. 19, 2009, retrieved from http://dev.w3.org/html5/spec/Overview.html, 654 pages.
"The Web Sockets API", W3C Working Draft, Dec. 22, 2009, retrieved from http://dev.w3.org/html5/websockets/, 12 pages.
Hickson, I. "The Web Socket protocol: draft-hixie-thewebsocketprotocol-68", Network Working Group, Internet-Draft, Google, Inc., Dec. 16, 2009, 40 pages.
"Web Sockets", From Wikipedia, the free encyclopedia, Retrieved on Dec. 21, 2009 from http://en.wikipedia.org/wiki/Web_socket, 2 pages.
Non-Final Office Action for U.S. Appl. No. 12/751,660, mailed Mar. 29, 2013, 11 pages.

\* cited by examiner

*Primary Examiner* — Andrea Leggett
(74) *Attorney, Agent, or Firm* — Brake Hughes Bellermann LLP

(57) ABSTRACT

According to one general aspect, a method of remotely controlling a remote computing device from a local computing device that is executing a web browser, may include receiving, via a Hypertext Transfer Protocol (HTTP), at least a graphical human interface output from the remote computing device. The method may also include displaying, within a display area defined by a Hypertext Markup Language (HTML) web element, wherein the HTML web element is interpreted by the web browser, the graphical human interface output from the remote computing device. The method may further include receiving, from the remote computing device via HTTP, at least one update to the graphical human interface output. And, the method may include dynamically updating the graphical human interface output displayed within the display area defined by the HTML web element, wherein updating is based upon the received at least one update to the graphical human interface output.

26 Claims, 14 Drawing Sheets

300

500

600

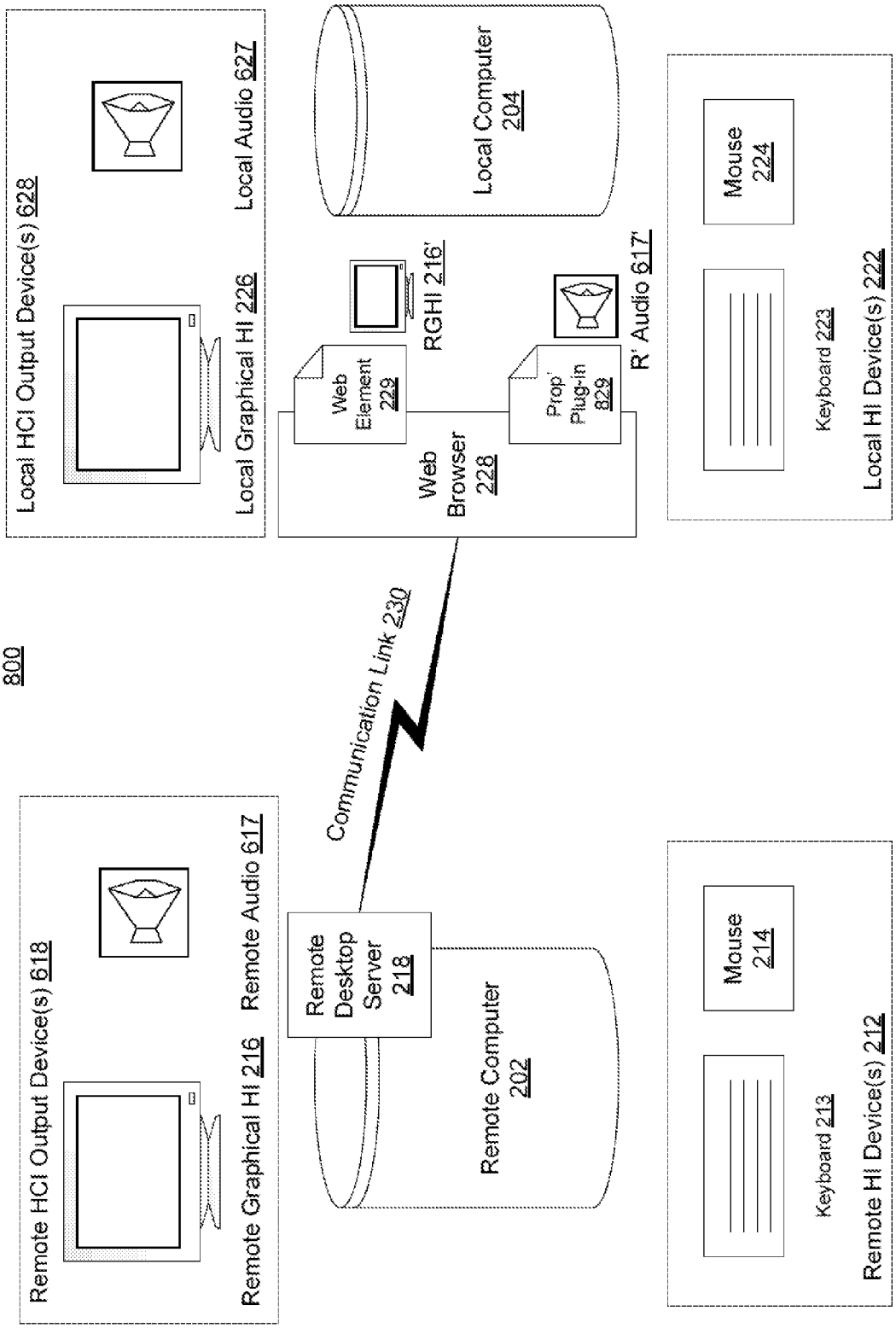

FIG. 9
900

```
<html>
<body>
<script type='text/javascript' src='canvasDraw.js'></script>
<script type='text/javascript' src='processHidInput.js'></script>

<canvas id="graphicalHI" width="800" height="600">
    <img src="images/error.png" width="150" height="150" alt=""/>
</canvas>

<object width="100" height="50">
    <param name="remoteAudio" value="remoteAudio.swf">
</object>
...
```

404
402
906

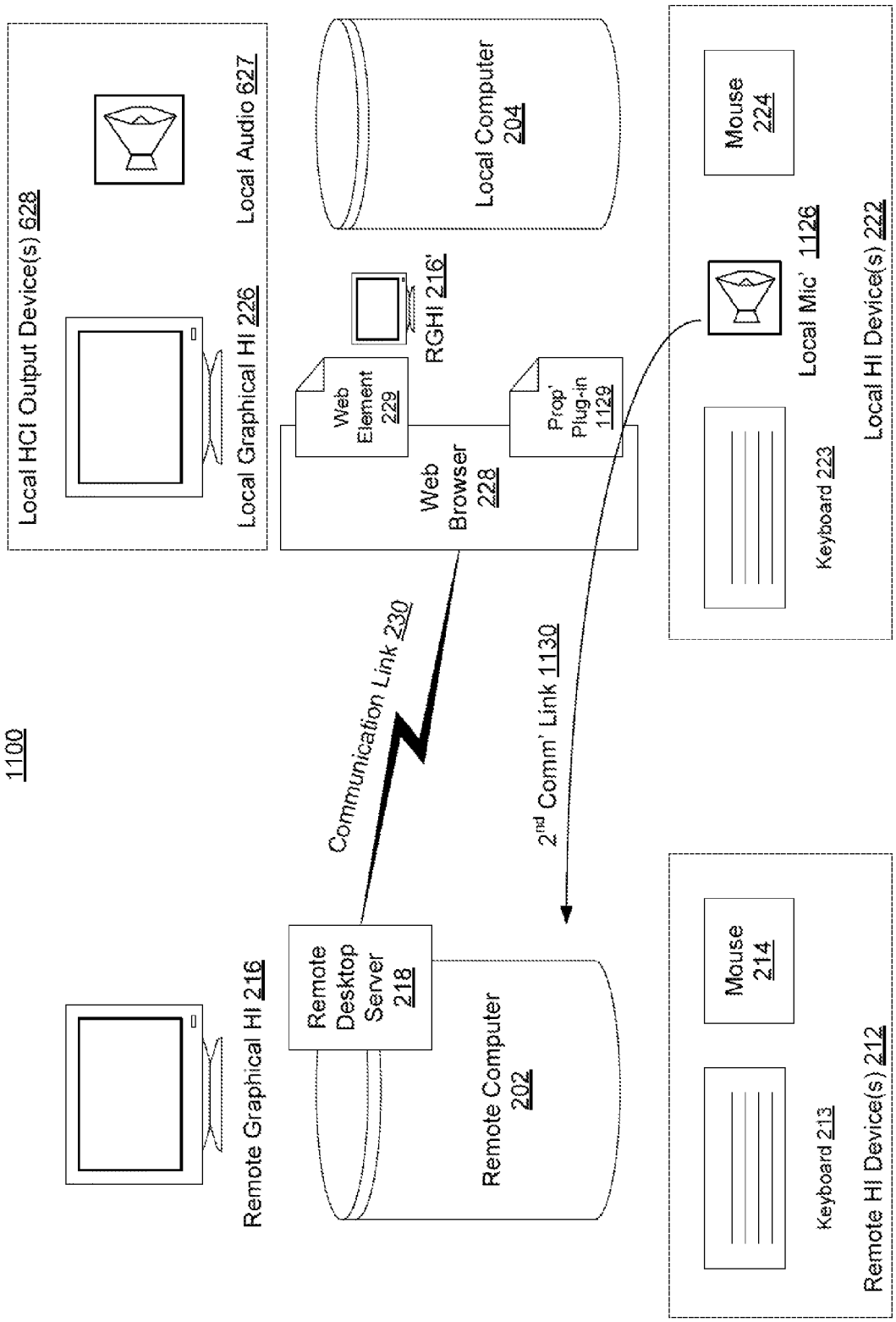

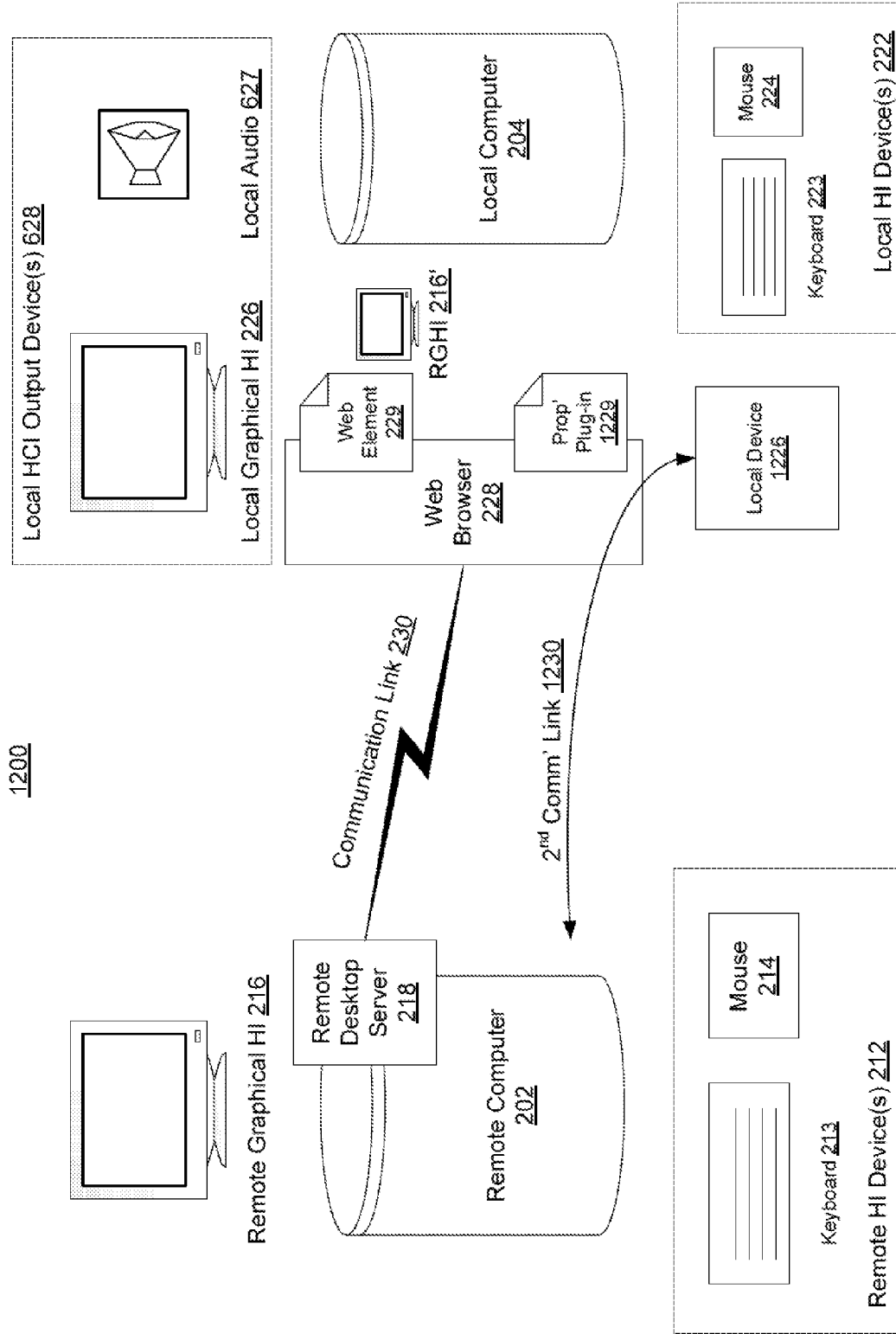

FIG. 13
1300

1302 Establishing a communication link, via the Hypertext Transfer Protocol (HTTP), between the web browser and a remote desktop server executing on the remote computing device

1304 Receiving, via a Hypertext Transfer Protocol (HTTP), at least a graphical human interface output from the remote computing device

1306 Displaying, within a display area defined by a Hypertext Markup Language (HTML) web element wherein the HTML web element is interpreted by the web browser, the graphical human interface output from the remote computing device

1308 Receiving, from the remote computing device via the HTTP protocol, at least one update to the graphical human interface output

1310 Dynamically updating the graphical human interface output displayed within the display area defined by the HTML web element, wherein updating is based upon the received at least one update to the graphical human interface output

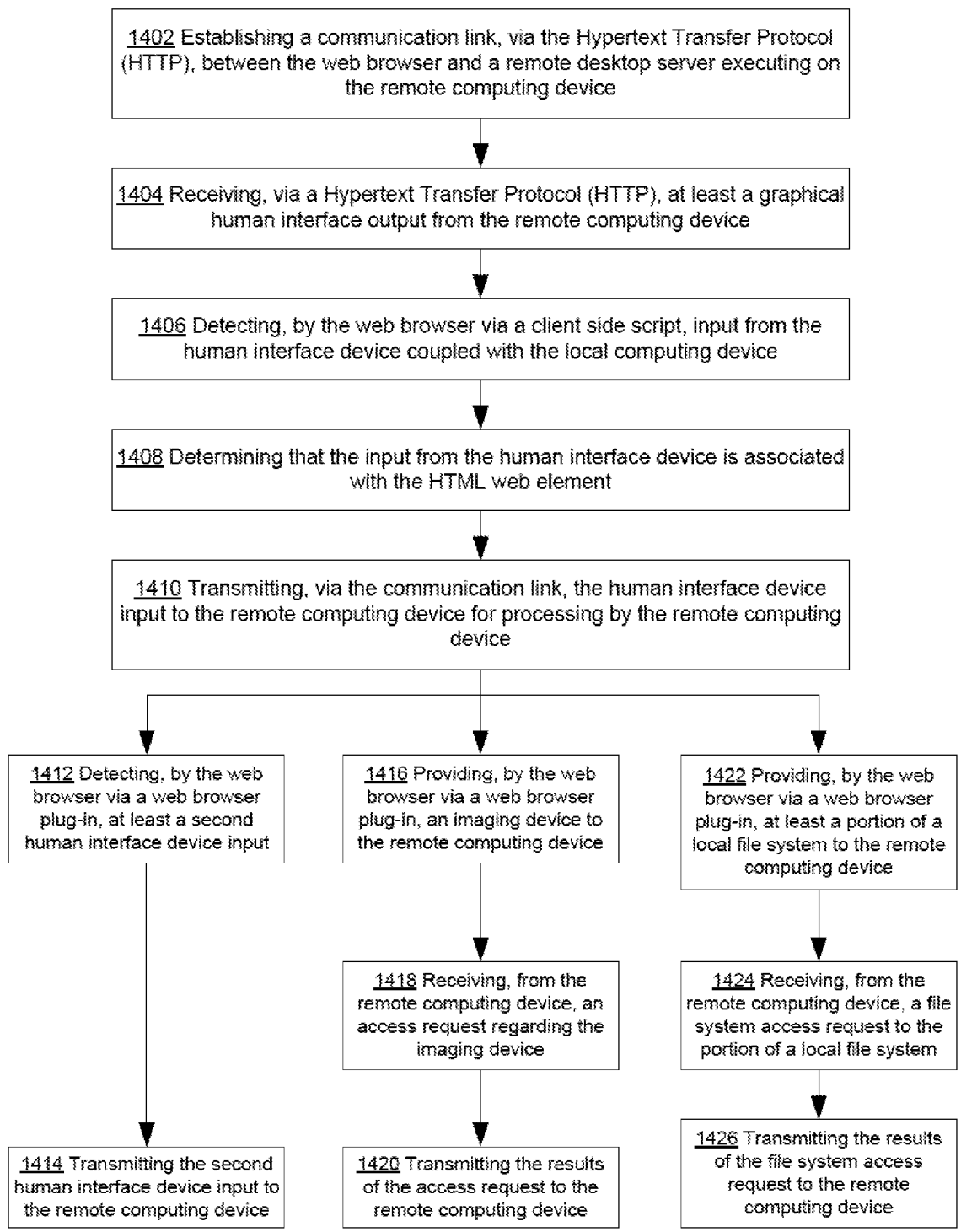

REMOTE CONTROL OF A COMPUTING DEVICE

TECHNICAL FIELD

This description relates to the remote control of a remote computing device, and more specifically to the display of the output (e.g., video, audio, etc.) on the local computing device.

BACKGROUND

Often it is desirable to control a remote computer or computing device via a local computing device (e.g., laptop, desktop computer, mobile phone or device, etc.). For example, an administrator may wish to "take over" or control a worker's computer in order to solve or work on a computing problem experienced by the worker. By remotely controlling the worker's computer, the administrator is no longer required to physically get up and go to the worker's computer. Instead the administrator may control the worker's computer (which is the remote computer from the perspective of the administrator) from the comfort of the administrator's office. Likewise, other remote control situations may be envisioned, for example telecommuting, accessing a home computer while on vacation, etc.

Typically, the software or apparatus that facilitates this remote computing takes the output of the remote computer and displays it at the local computing device. For example, the output of the remote computer may include the video that would normally be displayed to a monitor connected to the remote computer, any audio that would normally be played by any speakers connected to the remote computer, etc. These outputs may be sent to the local computer, where the remote video may be displayed on a local monitor or windows within a graphical user interface (GUI) of the local computing device, and the remote audio may be played by local speakers.

Likewise, local inputs to the local machine may be transmitted to the remote computer. For example, keyboards strokes and mouse actions made by the user at the local machine may be transmitted to the remote machine. The remote machine may then react to those local inputs (e.g., key strokes and mouse actions) as if those inputs had occurred at the remote computer. For example, key presses on the local machine may cause words to be "typed" at the remote machine; mouse movements may cause windows to be moved at the remote machine, etc.

Typically this transportation of inputs (keyboard strokes, mouse actions, etc.) and outputs (e.g., video, audio, etc.) are how the remote computing device is controlled by the local computing device. Often, these inputs and outputs are transported between the local and remote computing devices via the Internet or local networking technology.

In general, remote computing software is typically used to access a remote computer or first computing device from another (local) computer or second computing device. Typically such software uses a custom or proprietary compression format to detect changes on the display screen and send relevant new information from the remote machine to the local machine. This, frequently, requires both a compatible software application (e.g., a client application) on the local machine to decode and display the screen or video data, and a server software application on the remote machine to encode and transmit the screen of video data. Likewise, for other outputs from the remote computer and inputs from the local computing device. These proprietary server/client applications must often be specially installed by a user before a can access a remote computer.

In this context the word "proprietary" refers to a protocol or other component that is owned by a single organization or individual and often protected by various patent's and/or trade secrets, and is contrasted to "non-proprietary", which refers to a protocol or other component that is promulgated by a individual, organization or standard's body (e.g., World Wide Web Consortium (W3C), etc.) in which the protocol or other component is openly available to essentially anyone for free or a reasonable and non-discriminatory royalty.

Well know instances of remote computing software include Microsoft's Remote Desktop Protocol (RDP) (a.k.a. Terminal Server), Apple's Apple Remote Desktop (ARD), LogMeIn's eponymous LogMeIn software, or the various Virtual Network Computing (VNC) systems, etc. It is noted that RDP, ARD, and LogMein all include or make use of proprietary protocols and components.

SUMMARY

According to one general aspect, a method of remotely controlling a remote computing device from a local computing device that is executing a web browser, may include receiving, via a Hypertext Transfer Protocol (HTTP), at least a graphical human interface output from the remote computing device. The method may also include displaying, within a display area defined by a Hypertext Markup Language (HTML) web element, wherein the HTML web element is interpreted by the web browser, the graphical human interface output from the remote computing device. The method may further include receiving, from the remote computing device via the HTTP, at least one update to the graphical human interface output. And, the method may include dynamically updating the graphical human interface output displayed within the display area defined by the HTML web element, wherein updating is based upon the received at least one update to the graphical human interface output.

According to another general aspect, an apparatus may include a non-proprietary communications manager configured to receive, via a Hypertext Transfer Protocol (HTTP), at least a graphical human interface output from the remote computing device, and receive, from the remote computing device via the HTTP, at least one update to the graphical human interface output. The apparatus may also include a hypertext renderer configured to display, within a display area defined by a Hypertext Markup Language (HTML) web element wherein the HTML web element is interpreted by the hypertext renderer, the graphical human interface output from the remote computing device, and dynamically update the graphical human interface output displayed within the display area defined by the HTML web element, wherein updating is based upon the received at least one update to the graphical human interface output.

According to another general aspect, a computer program product for remotely controlling a remote computing device from a local computing device that is executing a web browser, may include executable code that, when executed, is configured to cause the local computing device to receive, via a Hypertext Transfer Protocol (HTTP), at least a graphical human interface output from the remote computing device; display, within a display area defined by a Hypertext Markup Language (HTML) web element wherein the HTML web element is interpreted by the web browser, the graphical human interface output from the remote computing device; receive, from the remote computing device via the HTTP, at least one update to the graphical human interface output; and dynamically update the graphical human interface output displayed within the display area defined by the HTML web element, wherein updating is based upon the received at least one update to the graphical human interface output. In various embodiments, the computer program product may be tangibly embodied on a computer-readable medium.

According to one general aspect, a method of remotely controlling a remote computing device from a local computing device coupled with a human interface device and executing a web browser, the method may include establishing a communications link, via a Hypertext Transfer Protocol (HTTP) protocol, between the web browser and the remote computing device. The method may include displaying, within a display area defined by a Hypertext Markup Language (HTML) web element, wherein the HTML web element is interpreted by the web browser, a graphical human interface output from the remote computing device. The method may further include detecting, by the web browser via a client-side script, input from the human interface device coupled with the local computing device. The method may also include determining that the input from the human interface device is associated with the HTML web element. And, the method may include transmitting, via the communication link, the human interface device input to the remote computing device for processing by the remote computing device.

According to another general aspect, an apparatus may include a non-proprietary communications manager configured to establish a communication link, via a standard non-proprietary web protocol, between the apparatus and the remote computer. The apparatus may include a hypertext renderer configured to display, within a standard non-proprietary web element drawn by the apparatus, at least one human interface device output from the remote computer, and detect, via a web browser client-side scripting language, at least one human interface device input. The apparatus may include a human interface device input manager configured to determine if the human interface device input is associated with the standard non-proprietary web element; and if so, request that the non-proprietary communications manager communicate the human interface device input to the remote computer.

According to another general aspect, a computer program product for remotely controlling a remote computing device from a local computing device that is executing a web browser, may include executable code that, when executed, is configured to cause the local computing device to establish a communications link, via a Hypertext Transfer Protocol (HTTP) protocol, between the web browser and the remote computing device; display, within a display area defined by a Hypertext Markup Language (HTML) web element wherein the HTML web element is interpreted by the web browser, a graphical human interface output from the remote computing device; detect, by the web browser via a client-side script, input from the human interface device coupled with the local computing device; determine that the input from the human interface device is associated with the HTML web element; and transmit, via the communication link, the human interface device input to the remote computing device for processing by the remote computing device. The computer program product may be tangibly embodied on a computer-readable medium.

The details of one or more implementations are set forth in the accompanying drawings and the description below. Other features will be apparent from the description and drawings, and from the claims.

A system and/or method for remotely controlling a remote computing device, substantially as shown in and/or described in connection with at least one of the figures, as set forth more completely in the claims.

BRIEF DESCRIPTION OF THE DRAWINGS

FIG. 8 is a block diagram of an example embodiment of a system in accordance with the disclosed subject matter.

FIG. 9 is a block diagram of an example embodiment of a file or data in accordance with the disclosed subject matter.

FIG. 11 is a block diagram of an example embodiment of a system in accordance with the disclosed subject matter.

FIG. 12 is a block diagram of an example embodiment of a system in accordance with the disclosed subject matter.

FIG. 13 is a flow chart of an example embodiment of a technique in accordance with the disclosed subject matter.

FIG. 14 is a flow chart of an example embodiment of a technique in accordance with the disclosed subject matter.

Like reference symbols in the various drawings indicate like elements.

DETAILED DESCRIPTION

Figure 2:
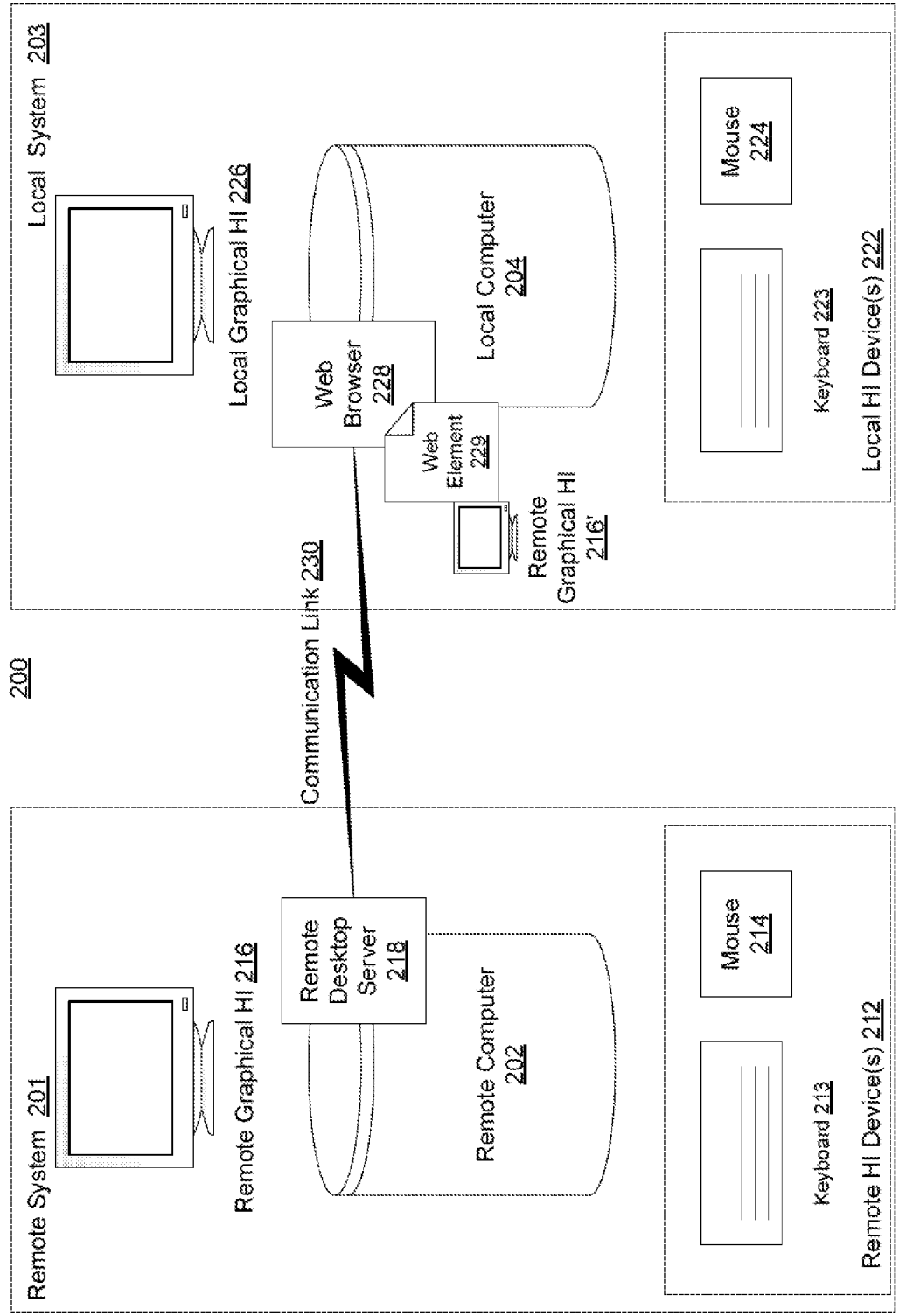
FIG. 2 is a block diagram of an example embodiment of a system in accordance with the disclosed subject matter.

FIG. 2 is a block diagram of an example embodiment of a system 200 in accordance with the disclosed subject matter. In one embodiment, the system 200 may include a remote computing system 201 and a local computing system 203. As described above, a user (not shown) may employ the remote computing system 203 to control, at least in part, the remote computing system 201.

In various embodiments, the remote computing system 201 may include a remote computer or computing device 202, a remote graphical human interface 216, and various remote human interface devices (HIDs) 212.

Generally, a remote graphical human interface 216 will include a monitor or other physical display. However, it is understood that a remote computing system 201 may be operated in a "headless" manner, meaning without a physical display. In such an embodiment, the remote commutating device 202 may still be configured to produce a graphical user interface (GUI) output (e.g., windows, a desktop environment, command line interface, etc.) even though there is no monitor or display available to convert that GUI output into a human understandable format. In this context, such a GUI output is referred to as a graphical human interface (GHI) (e.g., remote GHI 216, local GHI 226, etc.). Further, in this context, a "computer-human interface (CHI) output(s)" refers to any output from a computing device (e.g., remote computing device 202) designed or intended for consumption by a human user, for example, the video normally shown on a monitor or display, the audio played on a speaker, etc. Examples of a CHI may include a monitor, speakers, etc.

Conversely, in this context, remote "human interface devices (HIDs) inputs" refers to any inputs generated by a human user and designed or intended to be consumed by a computing device (e.g., remote computing device 202). Examples of a HID may include a keyboard 213, a mouse 214, a microphone (not shown), etc. Examples of HID inputs would then include key strokes, mouse movements, mouse clicks, audio from the microphone, etc.

As described above, when not controlled remotely, a remote computing device 202 may be normally controlled by a user sitting at or local to the remote computing device 202 via the remote (but local to the remote computing device 202) HIDs 212 and screen or display information may be shown to the user via the remote GHI 216. However, in the disclosed subject matter a user may wish to control the remote computing device 202 from a second location. In the context of this application, this second location is referred to as the "local" location as it is local to the user wishing to control the remote (from the user's perspective) computing device 202.

As described above, the user may employ a local computing system 203 to control the remote computing device 202. In such an embodiment, the local computing system 203 may include a local computer or computing device 204 (e.g., a laptop, netbook, desktop computer, mobile phone, etc.), a local GHI 226 (e.g., a monitor or display, etc.), and a local HID(s) 222 (e.g., a keyboard 223, mouse 224, a touch screen, etc.). It should be noted that while the traditional monitor, keyboard, and mouse arrangement of input/output devices is illustrated the disclosed subject matter is not so limited and does contemplate non-traditional input/output devices (e.g., touch screens; motion detection systems, for example Nintendo's Wii, Microsoft's Project Natal, etc.; interfaces for the disabled; etc.).

In such an embodiment, the user may make use of the local HIDs 222 to provide HID input to the remote computing device 202 and the RGHI 216 or HCI outputs from remote computing device 202 may be displayed or output at the local computing system 203 via the local GHI 226 or other HCI output interfaces (described in reference to other figures). As such, a user may type on the local keyboard 223 and the remote computing device 202 may react as if the typing occurred via the remote keyboard 213. The user may move the local mouse 224 and the remote computing device 202 may react as if the local mouse 214 was moved (e.g., causing a GUI window to be dragged across the GHI 216). These reactions by the remote computing device 202, as evidenced by a change in the GHI 216, may be displayed via the local GHI 226.

In various embodiments, the remote computing device 202 may include or execute a remote desktop server (RDS) 218. This RDS 218 may be configured to receive local (from the perspective of the user of the local computing system 203) HID input and execute or process that local HID input as if it occurred via the remote HIDs 212. The RDS 218 may also be configured to transmit the remote GHI 216 (in whole or part) from the remote desktop computing device 202 to the local computing device 204.

In various embodiments, the local computing device 204 may include or execute a web browser 228 or other client device, software, or combination thereof, to manage and control the user's interaction with the remote computing device 202. This web browser 228 may be configured to receive at least one CHI output (e.g., the remote GHI 216) from the remote computing device 202 and display or otherwise make available (e.g., play remote audio via a local speaker system, etc.) the received CHI output on the local computing system 203. The web browser 228 may also be configured to transmit local HID inputs to the remote computing device 202 for execution by the remote computing device 202, as described above.

In one embodiment, the web browser 228 may establish a communications link 230 between the RDS 218 and the web browser 228. This communications link 230 may be employed to communicate the HID inputs and CHI outputs, as described above. In various embodiments, this communication link 230 may include a Hypertext Transfer Protocol (HTTP) or its secure variation, Hypertext Transfer Protocol Secure (HTTPS). As is well known, HTTP and HTTPS include application-level protocols for distributed, collaborative, hypermedia information systems.

In various embodiments, the user may establish, via the web browser 228, the communications link 230 by directing the web browser 228 to a web page provided by the RDS 218. In some embodiments, once the remote desktop session is initiated, the web browser 228 may then establish a more complicated communication link 230 between the web browser 228 and the RDS 218. This may include the establishment of one or more Web Sockets. In general, Web Sockets is a technology providing for two-way full-duplex communications channels, each over a single Transmission Control Protocol (TCP) socket, and designed to be implemented in web browsers and web servers. The current standard for Web Sockets is provided by *The Web Socket protocol*, Network Working Group of the Internet Engineering Task Force (IETF), Dec. 16, 2009.

In such an embodiment, the use of HTTP, and in a more specific embodiment Web Sockets via HTTP, may provide a standardized non-proprietary web protocol which the communication link 230 may include or employ. Further, the sequential nature of HTTP may relieve the web browser 228 and RDS 218 from the burden of establishing or insuring that the HID inputs and CHI outputs are received in the same order in which they occurred. For example, it would be disconcerting for a user to see a GUI window that was being moved appear first in the final moved position and then suddenly jump back to an intermediate moved position because the two CHI output or GHI images arrived out-of-order from the remote computing device 202. In various embodiments, the underlying protocol (e.g., HTTP, HTTPS, etc.) may prevent such an out-of-order occurrence.

Figure 4:
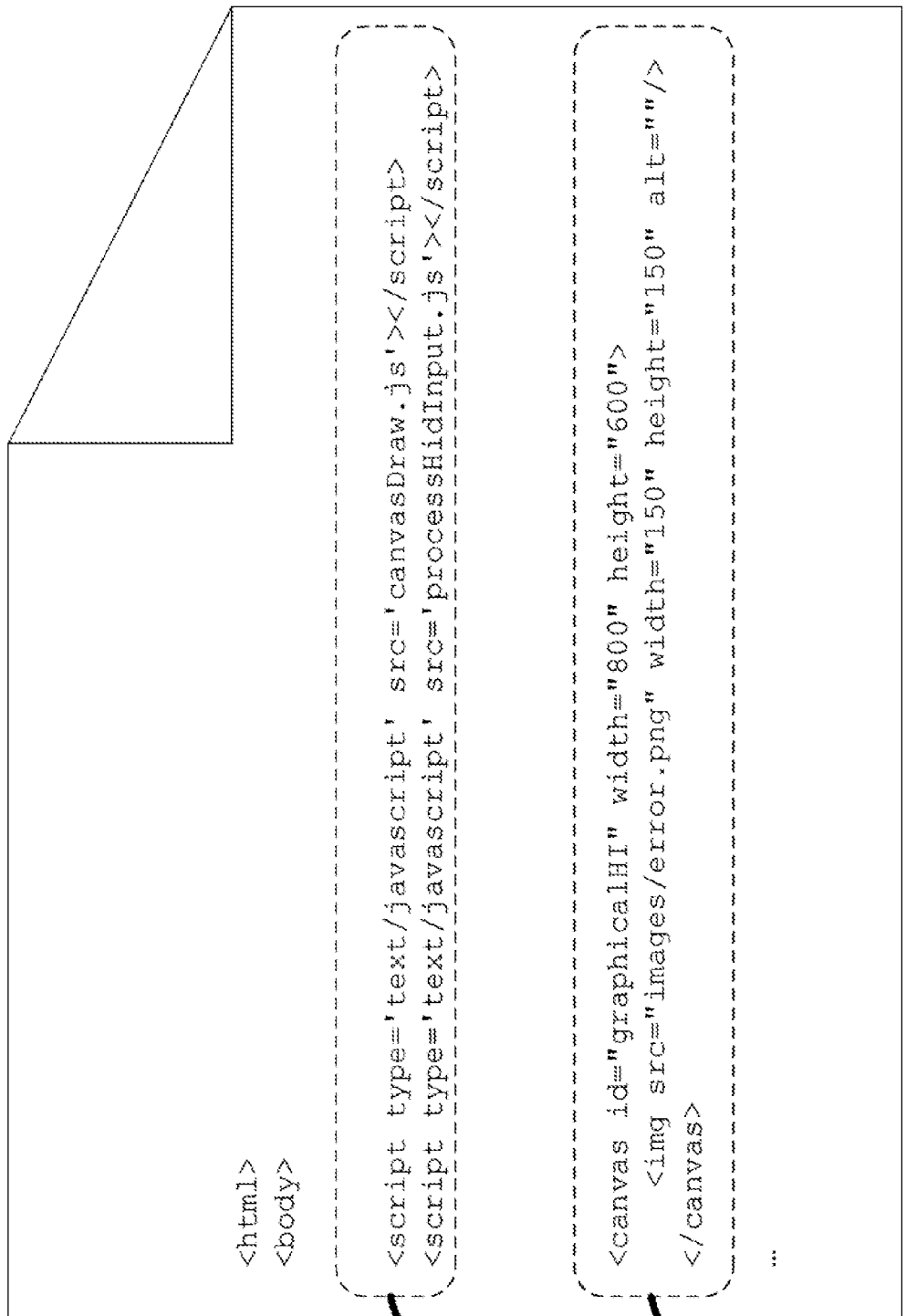
FIG. 4 is a block diagram of an example embodiment of a file or data in accordance with the disclosed subject matter.

In various embodiments, the web browser 228 may employ a web element 229 to define or contain the received CHI output or GHI 216 received from the remote computing device 202. As shown in FIG. 4, web pages include a number of web elements or tags which define how text, images, etc. are to be displayed by the web browser 228.

Examples, of well known web elements or tags include the B tag which tells the web browser to display any text within the B tag in a bold font. Likewise, the I tag tells the web browser to display any text within the I tag in an italic font. Images are displayed within an IMG web element or tag. More complex portions of a web page (e.g., Flash video, Java program, Microsoft Silverlight program, etc.) were traditionally identified by an OBJECT or EMBED web element or tag. Such a tag instructed the web browser 228 to execute a special add-on or plug-in (e.g., Adobe Flash, Sun Java, Microsoft Silverlight, etc.) to execute that portion of the web page. These add-ons or plug-ins were proprietary non-standard (i.e. not promulgated by a standards body, e.g., W3C, IETF, etc.) programs that executed pre-compiled files (usually downloaded from the web server that provided the web page). In this context, pre-compiled programs that are executed by such proprietary non-standard applications are referred to as Rich Internet Applications (RIAs).

In various embodiments, the web element or tag 229 that defines the area upon which to display the remote GHI 216 may include a standard (i.e. promulgated by a standards body, e.g., W3C, IETF, etc.) non-proprietary web element 229. Some embodiments of such web elements 229 may include web elements or tags defined within the Hypertext Markup Language (HTML) version 5 (HTML5) or an Extensible Hypertext Markup Language (XHTML), which is included by HTML5. The HTML5 standard is provided by *HTML 5: A vocabulary and associated APIs for HTML and XHTML*, W3C Editors Draft, 19 Dec. 2009. Herein the term "HTML5" includes the versions of HTML and/or XHTML defined by this specification and/or its derivatives and successors.

Examples of web elements or tags 229 that may be employed in various embodiments of the disclosed subject matter include, but are not limited to, the Canvas tag or element, the Video tag or elements, etc. These web elements 229 are discussed in more detail below in reference to other figures.

In various embodiments, the web browser 228 may be configured to display the remote GHI 216 within a display area or portion of the local display defined by the web element 229. This display area is illustrated by remote GHI 216'. In turn the web browser 228 and, therefore, the web element 229 (or at least the display area defined by the web element 229) and remote GHI 216' may be displayed upon or within the local GHI 226 and by local monitor or display that shows or makes local GHI 226 available to the user.

Figure 3:
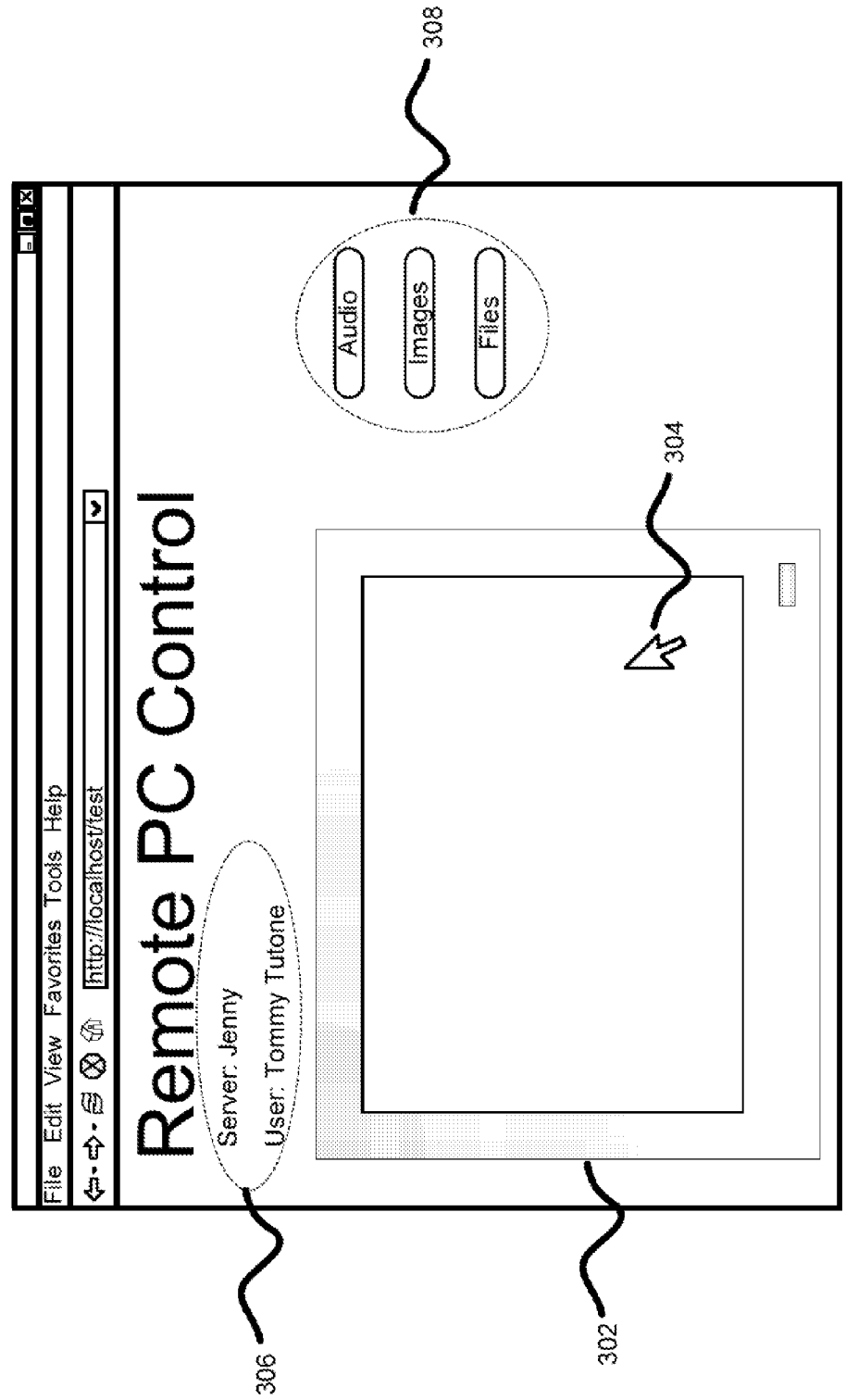
FIG. 3 is a block diagram of an example embodiment of a user interface in accordance with the disclosed subject matter.

FIG. 3 is a block diagram of an example embodiment of a user interface (UI) 300 in accordance with the disclosed subject matter. In various embodiments, the UI 300 may be included by or provided by a web browser (e.g., web browser 228 or FIG. 2). In such an embodiment, the UI 300 may include a web page that includes various text portions 306. Here the text portions 306 illustrate the name of the remote computing device, and the name of user logged into or controlling the remote computing device; although, it is understood that the above are merely a few illustrative examples to which the disclosed subject matter is not limited.

The UI 300 may also include a display portion or area 302 that is defined by a web element or tag (e.g., web element 229 of FIG. 2). This display portion or area 302 may be configured to display the remote GHI from the remote computing device. In various embodiments, the web browser and/or UI 300 may be placed in a "full screen" mode in which the display portion or area 302 may be displayed on the entire local monitor or local GHI. In some embodiments involving multiple monitors, the "full screen" mode may be confined to a single monitor or a subset of the multiple monitors.

In another embodiment, the display portion or area 302 may not display the entire remote GHI, but instead may display only portion of the remote GUI. Unlike the other portions of the remote GUI described for embodiments in which the remote GHI is greater than the display area 302 (e.g., a 1600×1200 remote GHI displayed within an 800×600 display area 302), this displayed portion of the remote GUI may be defined by an application or GUI window. For example, if the user wishes to remotely execute an email application or program, only the portions of the remote GHI associated with the email application (e.g., a GUI window, etc.) may appear in the display area 302.

In one embodiment in which a user desires to only see or have displayed the portions of the remote GHI associated with a single application or window thereof (e.g., the email application example above), the UI 300 may be configured to hide all or part of the hosting application's (e.g., a web browser's) UI and show only the display area 302 within the local GHI. In some embodiments, this remote GHI portion of the remotely executing application may be shown in a way that is virtually indistinguishable from a locally executing application. Conversely, this remote GHI portion of the remotely executing application may be shown in a way that is similar but distinguishable from a locally executing application. For example, the color scheme of the GUI (e.g., window, etc.) may differ from a locally executing application, extra toolbar buttons (e.g., next to the traditional close, minimize, maximize buttons) may appear, the title bar may indicate a remote application, etc.

In various embodiments, the UI 300 may determine whether or not a HID input (e.g., key stroke, mouse action) is to be transmitted to the remote computing device. In one embodiment, this determination may be based upon whether or not the HID input occurs when the display portion or area 302 has "focus". In this context, the term "focus" or "has focus" is a colloquial term meaning that display portion or area 302 is designated by an operating system executing the web browser to receive human interface device input. For example, if a mouse or cursor 304 is within the display portion or area 302, the web browser may determine that the display portion or area 302 has "focus" and, therefore the web browser may transmit the HID input to the remote computing device.

In other embodiments, the UI 300 include one or more UI elements 308 defined by respective web elements that allow additional HID inputs (e.g., microphone audio), CHI outputs (e.g., audio output), or other information to be transmitted between the local computing device and the remote computing device. Illustrated are buttons 308 that, in various embodiments, allow audio input or output to be transmitted between local and the remote computing devices, images to be uploaded from a local camera to the remote computing device, and local files to be transmitted or mounted to and from the remote computing device. Although, it is understood that the above are merely a few illustrative examples to which the disclosed subject matter is not limited.

FIG. 4 is a block diagram of an example embodiment of a file or data 400 in accordance with the disclosed subject matter. File 400, or more accurately the portion of file 400 illustrated, shows various web elements or tags that may be included within a web page displayed or executed by a web browser.

Web element 402 illustrates a Canvas element or tag that may define a display portion in which the remote GHI is to be displayed. In the illustrated embodiment, the Canvas tag defines an 800×600 pixel display area in which the remote GHI may be displayed by the web browser. In various embodiments, if the remote GHI is larger (e.g., 1600×1200, etc.) or smaller (e.g., 600×480, etc.) the web browser may scale the remote GHI appropriately. Conversely, in the case of a larger GHI, the web browser may not scale the remote GHI and only show a portion of the GHI and provide the user a means to move or determine which portion of the GHI is displayed.

In various embodiments, specifically those employing the Canvas web element, the web browser may receive, via the communication link, a static image (e.g., a bitmap, etc.) of the remote GHI. This image may then be displayed within the Canvas element 402 or at least the display area defined by the Canvas element 402.

As the remote GHI changes (e.g., in response to HID input supplied by the user via the local computing device, etc.) or at predefined time intervals, an updated static image of the updated remote GHI may be received by the web browser. The locally displayed GHI may then be updated based upon this received updated image. In one embodiment, the updated GHI image may simply replace the previous GHI image.

In another embodiment, the remote computing device may transmit a difference image that includes only the differences between a previous image (e.g., an original image, an intra-coded image, a previously generated image, etc.) and the current remote GHI. As described below, these difference images may be used to generate a new GHI image. In various embodiments, a difference image may also be referred to as a predicted picture or frame, or a bi-predicted picture or frame; although, it is understood that these terms are merely a few illustrative examples that may incorporate limitations and techniques on how the predicted/bi-predicted frames are created and decoded to which the disclosed subject matter is not limited.

Difference images may be used to reduce the amount of data transferred between the remote and local computing devices. As suggested above, some embodiments may employ a mixture of difference images and full images (a.k.a. intra-coded images) in order to reduce the amount of difference in each image. More and more difference may occur between the original image and the current image as the user uses the remote computing device. In various embodiments, these images may be compressed preferably using a lossless encoding scheme; although a lossy encoding scheme would be within the scope of the disclosed subject matter.

In an embodiment that employs difference images, the web browser or a client-side script (e.g., written in JavaScript, etc.) executed by the web browser may be configured to generate an updated GHI image based upon the difference image and another GHI image (e.g., an original image, an intra-coded image, the most recently generated updated GHI image, etc.). In such an embodiment, the differences indicated in the difference image may be made to the original or baseline image to generate the updated GHI image. This updated GHI image may then replace the current image displayed within the display area or portion defined by the Canvas web element 402.

Script web element 404 defines or references one or more client-side scripts that may be employed to detect HID input from the user at the local computing device and transmit that HID input to the remote computing device. Also, such scripts may also be employed to update the GHI or portion of the display area defined by the Canvas web element 402, establish the communication link or Web Sockets thereof, etc.

In this context, a client-side script may include source code that is read, interpreted or compiled, and executed by the web browser (which is referred to in the parlance as the client). A "script," as used herein, especially a client-side script, differs from a RIA in that the client-side script is not a pre-compiled binary provided to the web browser, but is instead text based source code, which the web browser then compiles or interprets before being able to execute the program thereof. Often client-side scripts are written in a standardized non-proprietary language (e.g., ECMAScript and its variations JavaScript, Jscript, ActionScript, etc.). Occasionally, a proprietary language may be employed (e.g., VBScript, ActiveX script, etc.).

In such an embodiment, the client-side script may determine if any HID input is associated with the web element 402 (e.g., the display area defined by the web element 402 has focus, etc.). The client-side script may also be configured to repackage or translate any local HID input to a more preferred remote HID input format. For example, a mouse action or event (e.g., a mouse click, etc.) may generate a set of coordinates at which the mouse event occurred. These coordinates may be in reference to the local GHI. As the remote GHI only occupies a portion of the local GHI (in a non-full screen mode) the coordinates may need to be translated to a remote GHI equivalent before being or after transmitted to the remote computing device.

Figure 5:
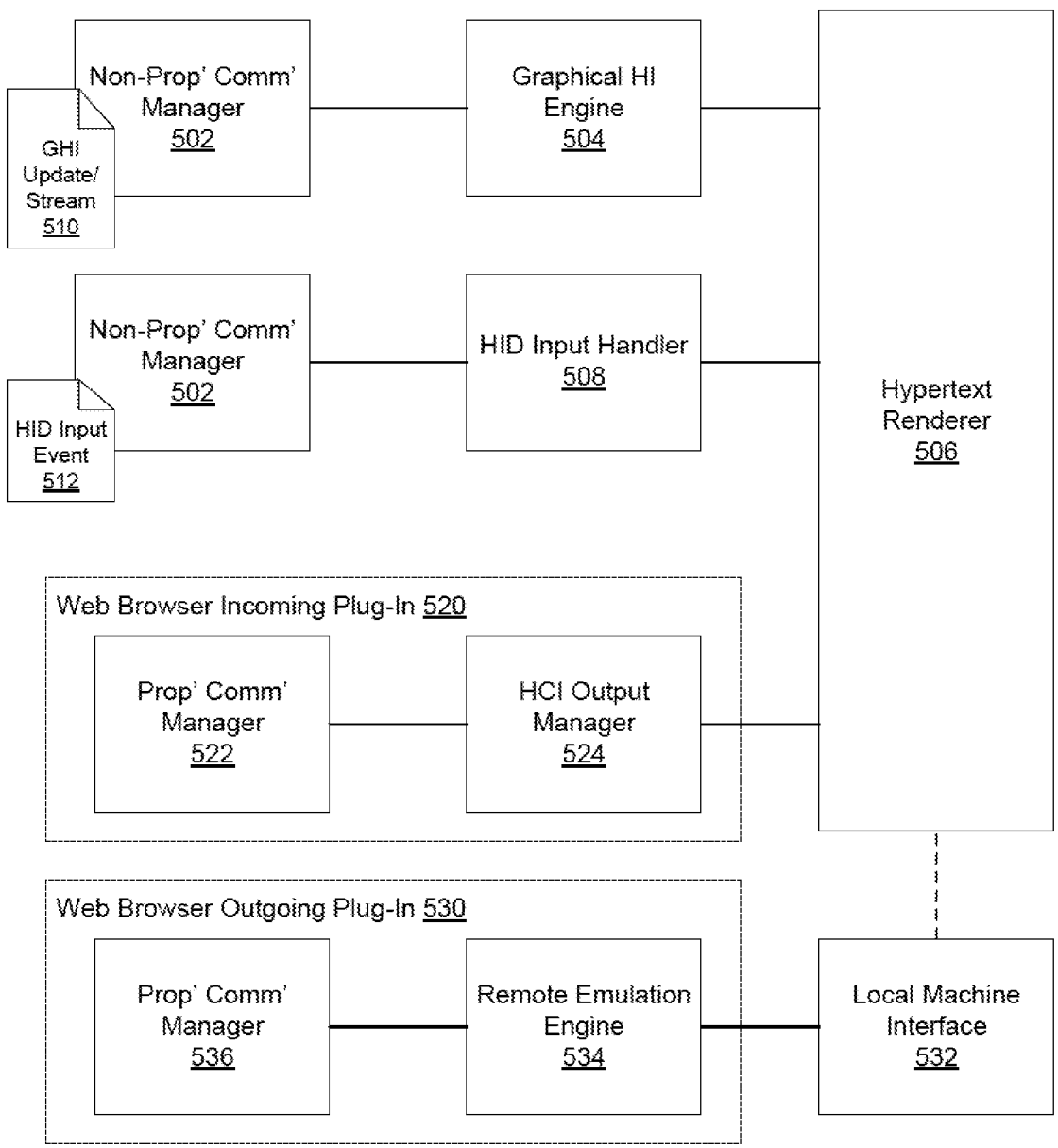
FIG. 5 is a block diagram of an example embodiment of a system in accordance with the disclosed subject matter.

FIG. 5 is a block diagram of an example embodiment of a system 500 in accordance with the disclosed subject matter. In various embodiments, the system 500 may include a web browser or special purpose apparatus.

In some embodiments, the system 500 may include a non-proprietary communications manager 502. This non-proprietary communications manager 502 may be configured to communicate with a remote computing device or a remote desktop server via a standard non-proprietary protocol, such as, an HTTP protocol. This HTTP protocol may include the HTTPS protocol and/or Web Sockets, as described above. In various embodiments, the non-proprietary communications manager 502 may be configured to receive, via the standard non-proprietary protocol, a GHI stream or series of updates 510 from the remote computing device. In another embodiment, non-proprietary communications manager 502 may be configured to receive one or more CHI outputs, which may include the GHI stream 510 or other HCI outputs, from the remote computing device.

The system 500 may also include the Graphical Human Interface Engine 504. The GHI engine 504 may be configured to process the received GHI stream or updates 510 to create an image of the remote GHI. In one embodiment that employs the Canvas web element, the GHI Engine 504 may generate a current image of the remote GHI based upon one or more static images, as described above. In another embodiment that employs the Video web element, the GHI Engine 504, may decode a video stream include by the GHI stream 510.

The system 500 may include a Hypertext Renderer 506. The Hypertext Render 506 may be configured to display a hypertext document (e.g., a HTML page or file, etc.) within the local GHI (e.g., monitor, etc.). In various embodiments, this rendered display may then be provided to the operating system for integration into the larger local GHI (which may include display elements from other systems or applications) as a whole. The Hypertext Render 506 may be configured to display the image generated by the GHI Engine 504 within a display area or portion defined by the standardized non-proprietary or HTML web element (e.g., Canvas element, Video element, etc.).

The Hypertext Renderer 506 may also be configured to detect, via a web browser client-side script, at least one human interface device input. The system 500 may include a HID Input Handler 508 which is configured to determine if the HID input is associated with the web element, or relevant to the remote computing device. Although, in some embodiments, the Hypertext Renderer 506 may be configured to this. The HID Input Handler 508 may also be configured to reformat or translate local HID input into a remote HID input format (e.g., adjusting mouse event coordinates, etc.), as described above. These HID input events 512 may then be transmitted to the remote computing device via the non-proprietary communications manager 502 or similar component.

In various embodiments, the system 500 may include web browser plug-ins that allow specialized interactions between the remote and local computing devices. In various embodiments, one or more of these specialized interactions may include human-to-computer interactions which are common (e.g., microphone audio input, etc.) but are not supported by a standard non-proprietary protocol or web element, and as such are not natively supported within a typical web browser or the system 500. In such an embodiment, an extra component (a.k.a. a plug-in or add-on) may be added to system 500.

Add-ins and Plug-ins differ from stand-alone applications in that they generally are loaded and executed by and under the supervision of a host application.

In one embodiment, the system 500 may include a web browser incoming plug-in 520 configured to process communications from the remote computing device that are not processed by the non-proprietary communications manager 502, and/or GHI Engine 504 (e.g., file operations, audio output, etc.). In various embodiments, the web browser incoming plug-in 520 may receive communications from the remote computing device via the non-proprietary communications manager 502. In another embodiment, the web browser incoming plug-in 520 may communicate with the remote computing device directly or at least without the aid of the non-proprietary communications manager 502. Example embodiments of the plug-ins 520 and 530 and their usage cases are provided below in reference to later figures.

In various embodiments, the web browser incoming plug-in 520 may include a proprietary communications manager 522 configured to receive one or more HCI outputs from the remote computing system via a proprietary communications protocol or formatting scheme (e.g. a special compression scheme, etc.). This received HCI output may be processed by the HCI Output Manager 524, which may be included by the system 500 and web browser incoming plug-in 520. The processed HCI output may be directed to the Hypertext Renderer 506 (e.g., as audio to be played by the local speakers, etc.) or to a local machine interface 532 (e.g., information to be written to a local file system or file, etc.). The local machine interface 532 may be included by the system 500 and configured to perform non-hypertext related tasks at the local machine (e.g., reading and writing to files, etc.).

In one embodiment, the system 500 may include a web browser outgoing plug-in 530 configured to process communications from the local computing device to the remote computing device that are not processed by the non-proprietary communications manager 502, and/or HID input handler 508 (e.g., file operations, microphone audio input, etc.). In various embodiments, the web browser outgoing plug-in 530 may provide communications to the remote computing device via the non-proprietary communications manager 502. In another embodiment, the web browser outgoing plug-in 530 may communicate with the remote computing device directly or at least without the aid of the non-proprietary communications manager 502.

In various embodiments, the web browser outgoing plug-in 530 may include a remote emulation engine 534 configured to emulate a remote hardware component (e.g., a microphone, camera, hard drive, etc.). The remote emulation engine 534 may receive a local input, HID (e.g., microphone audio, etc.) or non-HID (e.g., file system information, etc.), and package or reformat the input into a form useable by the remote computing device or RDS. These local inputs may be received by the remote emulation engine 534 from the local machine interface 532. For example, the local machine interface 532 may be configured read images from a locally connected camera, read and write to a local hard drive or flash memory device (e.g., a USB stick, etc.); although, it is understood that the above are merely a few illustrative examples to which the disclosed subject matter is not limited.

The web browser outgoing plug-in 530 may also include a proprietary communications manager 536 configured to communicate the reformatted local input to the remote computing system via a proprietary communications protocol or formatting scheme (e.g. a special compression scheme, etc.).

Figure 6:
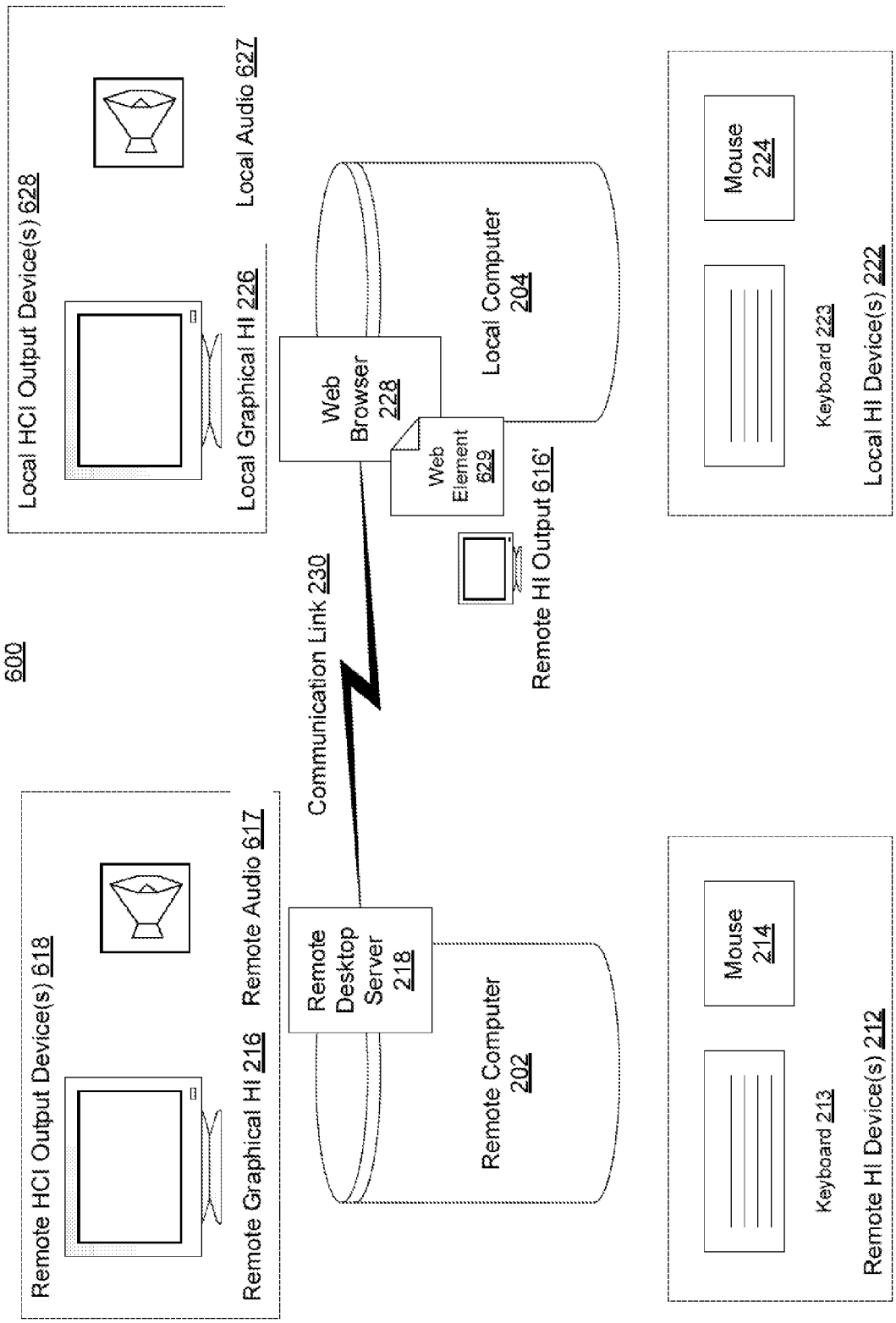
FIG. 6 is a block diagram of an example embodiment of a system in accordance with the disclosed subject matter.

FIG. 6 is a block diagram of an example embodiment of a system 600 in accordance with the disclosed subject matter. System 600 illustrates an embodiment in which audio output may be transmitted from the remote computing device 202 to the local computing device 204. In such an embodiment, the system 600 may include remote HCI output devices 618. These devices 618 may include a remote GHI 216 (e.g., a monitor, etc.) and a remote audio output 617 (e.g., audio played via remote speakers, etc.). Likewise, the system 600 may also include one or more local HCI output device 628. These devices 628 may include a local GHI 226 (e.g., a monitor, etc.) and a local audio output 627 (e.g., audio played via local speakers, etc.).

In the illustrated embodiment, the system 600 may include a new web element 629 that is configured to define both a portion of the local GHI 226 in which to display the remote GHI 616', but also a define a local audio stream to be played or output via the local audio device 627. In such an embodiment, the web element 629 may include an element that defines a video stream to be displayed by the web browser 228, as opposed to the web element 229 of FIG. 2 which merely facilitated the display of images.

Figure 7:
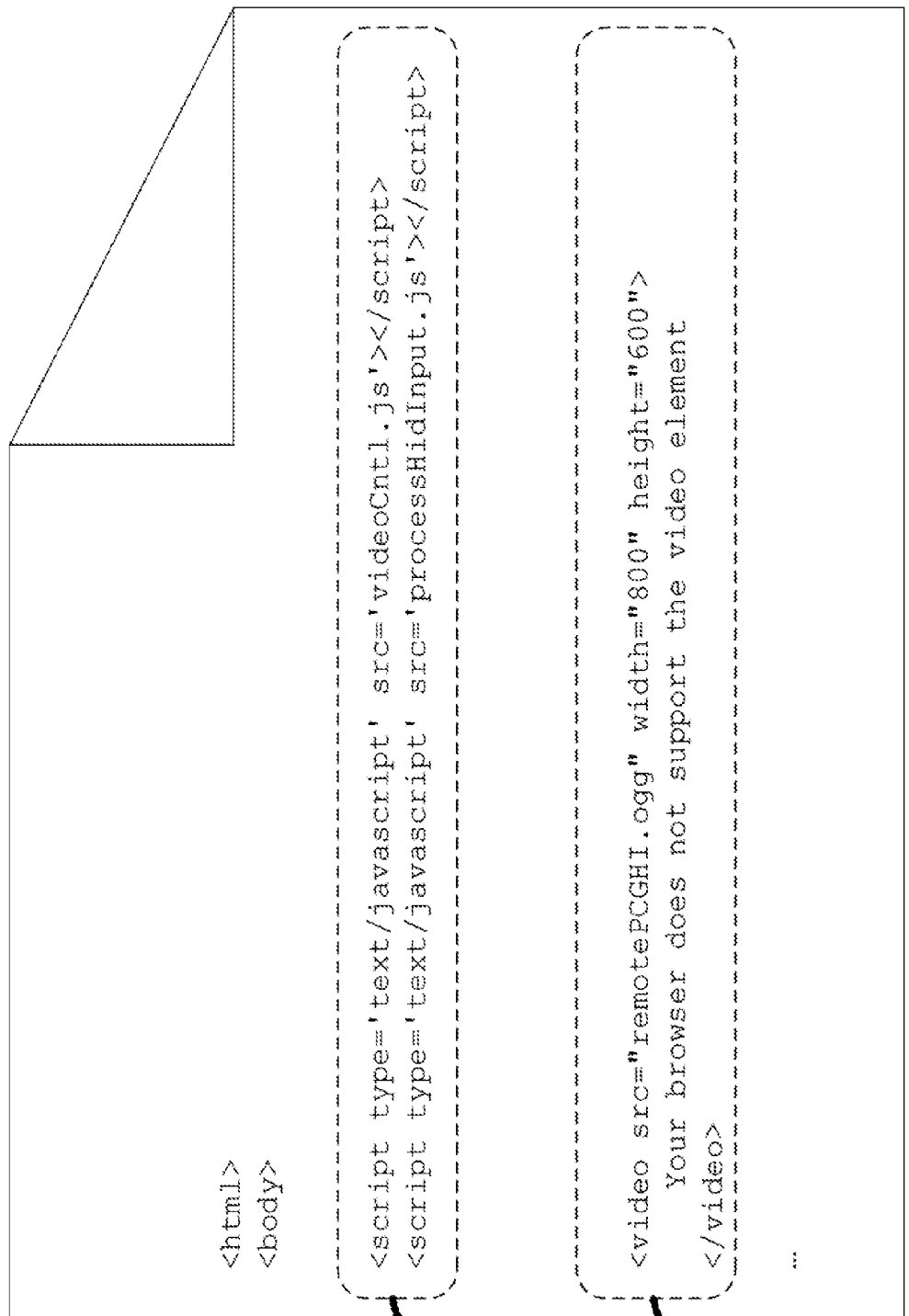
FIG. 7 is a block diagram of an example embodiment of a file or data in accordance with the disclosed subject matter.

FIG. 7 is a block diagram of an example embodiment of a file or data 700 in accordance with the disclosed subject matter. File 700, or more accurately the portion of file 700 illustrated in FIG. 7, shows various web elements or tags that may be included within a web page displayed or executed by a web browser.

Web element 702 illustrates a Video element or tag that may define a display portion in which the remote GHI is to be displayed. In the illustrated embodiment, the Video tag defines an 800×600 pixel display area in which the remote GHI may be displayed by the web browser. In various embodiments, if the remote GHI is larger (e.g., 1600×1200, etc.) or smaller (e.g., 600×480, etc.) the web browser may scale the remote GHI appropriately. Conversely, in the case of a larger GHI, the web browser may not scale the remote GHI and only show a portion of the GHI and provide the user a means to move or navigate which portion of the GHI is displayed.

In various embodiments, specifically those employing the Video web element, the web browser may receive, via the communication link, a video stream of the remote GHI (e.g., a file named remotePCGHI.ogg, etc.). This video may then be displayed within the Video element 702 or at least the display area defined by the Video element 702. In such an embodiment, the video stream may be continuously received regardless of any actions taken by the user. However, as the user's actions and HID inputs may change what is displayed by the remote GHI, the Remote Desktop Server may continuously generate or update the video stream.

Generally, a video stream includes a stream of images (e.g., difference images, intra-coded images or frames, bi-predictive pictures, etc.) and an audio stream. These image and audio streams may be included within a wrapper or container video stream (e.g., Ogg, H.264, MPEG, Divx, the Matroska Multimedia Container (Mkv), etc.). In various embodiments, the stream of images and audio stream may be multiplexed within the video stream.

In such an embodiment, an audio output may be transmitted as part of the video stream. This allows the remote GHI and remote audio outputs to be properly synchronized, which respect to each other. Further, HTML5 capable web browsers are often designed to play the audio portion of a video stream without the need of a piece of plug-in software.

Web element 704 may include a client-side script to control the video stream or the definition provided by the web element 702. For example the client-side script may allow a user to resize the display area defined by the web element 702.

FIG. 8 is a block diagram of an example embodiment of a system 800 in accordance with the disclosed subject matter. System 800 illustrates an embodiment in which audio output may be transmitted from the remote computing device 202 to the local computing device 204. In such an embodiment, the system 800 may include remote HCI output devices 618. These devices 618 may include a remote GHI 216 (e.g., a monitor, etc.) and a remote audio output 617 (e.g., audio played via remote speakers, etc.). Likewise, the system 800 may also include one or more local HCI output device 628. These devices 628 may include a local GHI 226 (e.g., a monitor, etc.) and a local audio output 627 (e.g., audio played via local speakers, etc.).

In the illustrated embodiment, the system 800 may include the web element 229 (also of FIG. 2) that is configured to define a display area in which to display the remote GHI 216'. In addition, the system 800 may include a proprietary plug-in 829 configured to receiving a HCI output (e.g., remote audio 617, etc.) or other information (e.g., file system information, etc.) from the remote computing device 202 and make that information available via the local computing device 204. While the system 800 illustrates an audio HCI output, it is understood that audio is merely one illustrative example to which the disclosed subject matter is not limited. In various embodiments, the use of the proprietary plug-in 829 may be invoked or indicated by a second web element (illustrated in FIG. 9).

In such an embodiment, the remote audio 617 may be produced by the remote computing device 202. This remote audio 617 may be transmitted by the RDS 218 to the local computing device 204, and more specifically to the web browser 228. In one embodiment, the transmission of the remote audio 617 may occur via the communications link 230. In another embodiment, transmission of the remote audio 617 may occur via a second possibly proprietary communications link or protocol (not shown). This remote audio 617 may be received by the web browser 228 or merely the proprietary plug-in 829, thereof. It is contemplated that a plurality of plug-ins may exist within or be associated with the web browser 228, and that the web browser 228 includes a means to select the proper plug-in to receive the remote audio 617. Upon receipt of the remote audio 617 the proprietary plug-in 829 may process the remote audio 617 and play it as remote audio 617'.

Likewise a similar scheme or technique may occur for embodiments of proprietary plug-in 829 that process more complex output from the remote computing device 202. Such output may include, but is not limited to, file system information, copy-n-paste information, printer or printing information, etc.

FIG. 9 is a block diagram of an example embodiment of a file or data 900 in accordance with the disclosed subject matter. File 900, or more accurately the portion of file 900 illustrated in FIG. 9, shows various web elements or tags that may be included within a web page displayed or executed by a web browser.

Web elements 402 and 404 are shown. Web element 402 includes the Canvas web element as described in reference to FIG. 4.

Web element 906 illustrates an Object element or tag that may define a portion of the web page 700 in which the remote audio is to be handled. In the illustrated embodiment, which shows an audio file with a SWF extension at a parameter of the web element 906, an Adobe Flash RIA may be invoked to play remote audio. In various embodiments, this proprietary plug-in (e.g., the Adobe Flash RIA, etc.) may not be allocated any display area or portion of the local GHI. In another embodiment, a display area may be allocated to the proprietary plug-in, for example to display a control interface (e.g., volume controls, etc.).

In such an embodiment, the remote GHI output (handled via web element 402) and the remote audio output (handled via web element 906) may need to be synchronized with respect to each other. In one embodiment, the remote output handled by the web element 906 may occur asynchronously with the remote GHI (e.g., file system information, etc.). In various embodiments, a client-side script may be employed to synchronize the remote GHI and remote audio or other output. In addition, a client-side script may control a user's interaction with the proprietary plug-in. Alternatively, a RIA may include its own control and user interface elements.

Figure 10:
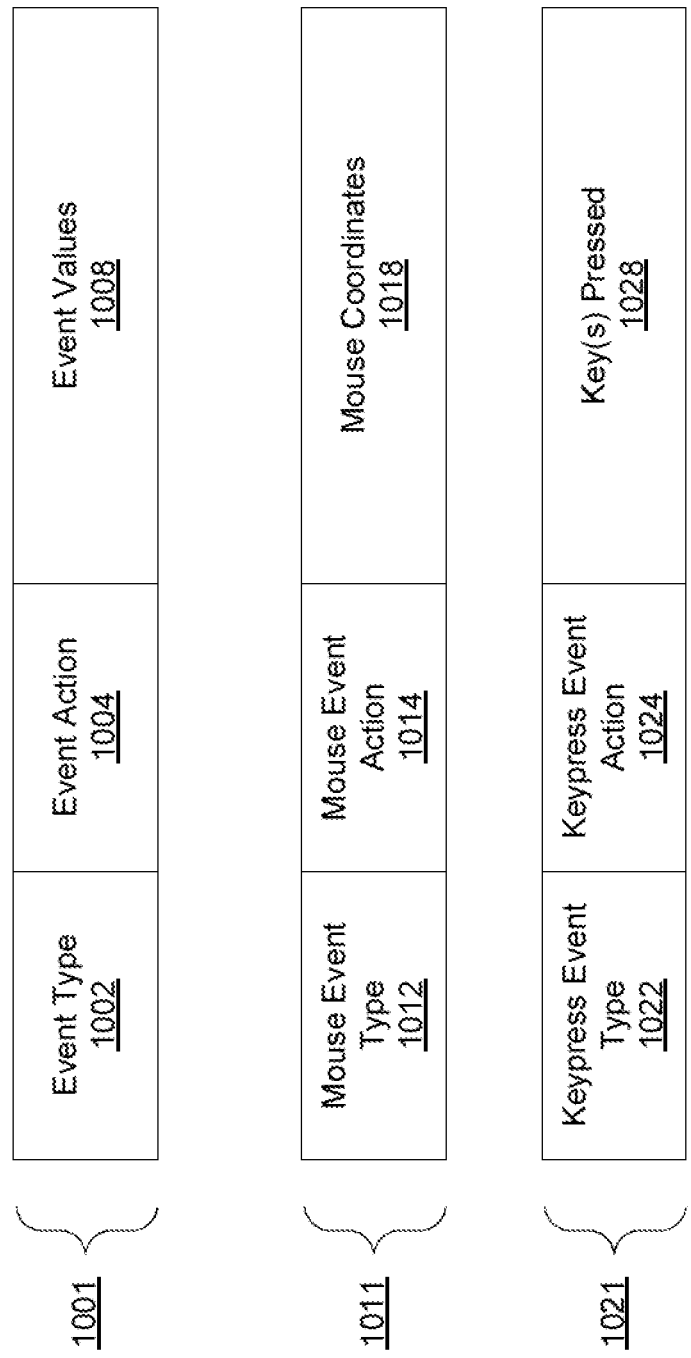
FIG. 10 is a block diagram of example embodiments of data in accordance with the disclosed subject matter.

FIG. 10 is a block diagram of example embodiments of data in accordance with the disclosed subject matter. FIG. 10 returns to the user HID input and the client-side scripts to process that HID input first discussed in regards to FIG. 4.

Generally, the operating system or apparatus executing the web browser generates an event every time something happens at the attached (wired or wirelessly attached) HIDs for example, when a user presses a key down a key press event is generated. Also, f a user moves the mouse a mouse event is generated.

Data 1001 illustrates a generic HID input event that typically includes two or three portions. The first portion 1002 includes a field that indicates what type of event has occurred (e.g., a keyboard event, mouse event, etc.). This event type field 1002 often indicates which HID generated the event (e.g., keyboard, mouse, etc.). The second field 1004 generally indicates what event action occurred (e.g., left mouse button clicked, key pressed down, etc.). The event action field 1004 is generally selected from a limited number of actions possible from the associated HID (e.g., keyboard, mouse, etc.). In various embodiments, the event type field 1002 and the event action fields 1004 may be combined into a single field. The third field 1008 indicates value(s) specific to the type of action or event that is the subject of event data 1001. This event values field 1008 meaning may change based upon the associated event.

Mouse event data 1011 illustrates a specific example of a mouse event that may be generated in response to a HID input event from the user of the local machine. This mouse event 1011 may be detected by the web browser (e.g., via a client-side script, etc.), processed, and transmitted to the remote computing device, where it will be executed by the remote computing device as if or similarly to an event or input that was generated by a remote HID, as described above.

The mouse event 1011 may include a mouse event type field 1012 that indicates that the event is associated with the mouse HID, a mouse event action field 1014 that indicates the type of action performed with the mouse (e.g., left click, left double click, left button down and hold, left button released, etc.), and a mouse coordinates field 1018 that indicates at which coordinates on the GHI this event occurred.

A keyboard event 1021 may include a keypress event type field 1022 that indicates that the event is associated with the keyboard HID, a keypress event action field 1024 that indicates the type of action performed with the keyboard (e.g., key pressed down, key released, etc.), and a key pressed field 1028 that indicates at which key or keys caused this event or is associated with the event (e.g., "K", "k", "Control+k", "F1", etc.). It is understood that the above are merely a few illustrative examples of HIDs and their associated event and the disclosed subject matter is not limited to these HIDs.

As described above, a client-side script (e.g., written in JavaScript, etc.) may be employed to detect when a HID input or event occurs. For example, the client-side script may detect any HID inputs or events captured by the web browser or executing apparatus.

In one embodiment, the client-side script or portion thereof may determine if the detected HID input should be passed to the remote computing device. This may include determining if the HID input is associated with the HTML web element that defines the display area used to display the remote GHI (e.g., display area 302 of FIG. 3. In various embodiments, this may include a determination of whether or not the display area has "focus", that is, that the portion of the web browser screen or local GHI is designated by an operating system executing the web browser to receive HID input.

In a more complex embodiment, one or more display areas, web elements, or HIDs themselves may be associated with the HTML web element that defines the display area used to display the remote GHI. For example, in the case where local microphone input is transmitted to the remote computing device, the microphone itself may be associated with the HTML web element at all times that the web browser is executing the remote control web page. Therefore, any HID input (e.g., audio) from the microphone may be associated with the HTML web element until the web browser no longer executes or closes the remote control web page including the HTML web element. Similarly more complex association schemes may be devised to other HIDs.

In addition, the client-side script may be configured to filter or modify the HID input generated by the local HID before transmitting the HID input to the remote computing device. For example, certain control keys may have special meaning to the client-side script or applications of the local machine in general (e.g., Control-Alt-Delete, etc.). The client-side script may be configured to hide these control keys or other predetermined or user configurable HID inputs from the remote computing machine.

In another embodiment, the client-side script may be configured to remap various HID inputs. For example, a user may wish to create a Control-Alt-Delete key event on the remote computing device. However, such an event may be blacklisted or prevented from being directly transmitted to the remote computing device. Therefore, the client-side script may be configured to interpret a local Control-Alt-Insert key event as a remote Control-Alt-Delete key event. In such an embodiment, once the client-side script detects the Control-Alt-Insert key event, the client-side script may alter the key(s) pressed field 1028 of the key event 1021 to indicate that the Control-Alt-Delete keys where pressed. While these examples have been limited to key events, variations of such actions for other HIDs and their associated HID inputs are contemplated. Further these maskings of local HID events or mapping of local HID events to remote local HID events may be predetermined or user configurable.

As described above, the client-side script may be configured to transform certain local HID inputs described by the event in terms of the local computing device's frame of reference to a frame of reference used by the remote computing device. For example, a local mouse event or input may include mouse coordinates that are relative to the local computing device. For example, a mouse click within remote GHI display area defined by the HTML web element may indicate a set of mouse coordinates 400, 300, where mouse coordinates are given in terms of pixels from the upper left corner of the local GHI or monitor. However, the display area defined by the web element may start or have its upper-left corner at the 200, 100 pixel of the local GHI. In such an embodiment, the client-side script may adjust the HID input mouse coordinate by an offset (e.g., 200, 100; etc.) to represent that the mouse event occurred at coordinates 200, 200 in a frame of reference relative to the remote computing device. This revised or transformed HID input may then be transmitted to the remote computing device.

Further mouse-based transforms may occur for instances when the remote GHI is scaled (e.g., a 1600×1200 GHI is shrunk and shown in a 800×600 display area, etc.) or when the remote GHI is panned (e.g., instead of scaling the 1600×1200 GHI to a 800×600 display area, only a quarter of the un-scaled 1600×1200 GHI is displayed at a time), etc. Further while the transformation of a mouse event or mouse-based HID input is discussed variations of such actions for other HIDs and their associated HID inputs are contemplated.

FIG. 11 is a block diagram of an example embodiment of a system 1100 in accordance with the disclosed subject matter. In such an embodiment, the web browser 228 may include or be associated with a proprietary plug-in 1129. In this embodiment, the proprietary plug-in 1129 may be configured to receive HID input from a HID and communicate or transmit that HID input to the remote computing device 202. For example the HID associated with the proprietary plug-in 1129 may include a local microphone 1126. As a user speaks into this local microphone 1126 the audio signal generated by the local microphone 1126 may be transmitted to the remote computing device 202 via the proprietary plug-in 1129.

In various embodiments, the proprietary plug-in 1129 may be configured to employ the communications link 230 established by the web browser 228. In another embodiment, the proprietary plug-in 1129 may be configured to establish a second communications link 1130 with the remote computing device 202 or the RDS 218. This second communications link 1130 may employ a non-standard proprietary web communications protocol (e.g., a non-HTTP protocol, etc.). As described above, upon receipt of this HID input from the microphone 1126 the remote computing device 202 may process or execute this HID input as if it originated from a HID attached with the remote computing device 202.

While a local microphone 1126 it illustrated, it is understood that the above is merely an illustrative example of a HID to which the disclosed subject matter is not limited. Furthermore, while a proprietary plug-in 1129 is illustrated, embodiments that employ a plug-in based upon non-proprietary protocols is within the scope of the disclosed subject matter.

FIG. 12 is a block diagram of an example embodiment of a system 1200 in accordance with the disclosed subject matter. System 1200 illustrates that input and output to and from the remote computing device 202 may occur for other devices outside the scope of a traditional HID or HCI. In such an embodiment, a proprietary plug-in 1229 may be employed to communicate between the local device 1226 (e.g., hard drive, flash memory stick, camera, printer, etc.) and the remote computing device 202.

For example, the proprietary plug-in 1229 may facilitate the mounting or accessing of a local file system (e.g., on a hard drive, flash memory stick, etc.) by the remote computing system 202. In another example, the proprietary plug-in 1229 may facilitate the accessing of an imaging device (e.g., a camera, webcam, video recorder, cellular phone with a camera, etc.) by the remote computing system 202. In yet another embodiment, the proprietary plug-in 1229 may facilitate the accessing of a printing device (e.g., a hardware printer, a software printer such an Adobe PDF writer, etc.) from the remote computing device 202 so that a user may print output from the remote computing device 202 locally. It is understood that the above are merely a few illustrative examples to which the disclosed subject matter is not limited.

In various embodiments, the proprietary plug-in 1229 may be configured to employ the communications link 230 established by the web browser 228. In another embodiment, the proprietary plug-in 1229 may be configured to establish a second communications link 1230 with the remote computing device 202 or the RDS 218. This second communications link 1230 may employ a non-standard proprietary web communications protocol (e.g., a non-HTTP protocol, etc.) and may be bi-directional. In the example of a mounted file system, the communications link 1230 may be employed to transmit read and write requests generated by the remote computing device 202 to and from the local device 1226 (e.g., hard drive, flash memory stick, etc.) that includes the file system. In such a way the user may work with files that are local (i.e., on the local device 1126) using the executing power of the remote computing device 202, and not be bothered with the explicit steps of individually copying each desired filed to and from the remote computing device 202 (e.g., via HTTP upload and download requests, etc.).

Furthermore, it is understood that for each plug-in or HID input and output shown in the above figures (e.g., FIGS. 2, 6, 8, 11 and 12) the RDS 218 may be configured to support the input or output shown. Alternatively, a second server (not shown) may be executed separately or as part of the RDS 218 (e.g., a RDS plug-in, etc.) that is configured to support the input or output shown. In this context "support" refers to the RDS's 218 ability to provide the inputs/outputs as if they as being generated from or going to devices connected with the remote computing device 202 (e.g., a monitor, keyboard 213, mouse 214, etc.).

FIG. 13 is a flow chart of an example embodiment of a technique in accordance with the disclosed subject matter. In various embodiments, the technique 1300 may be used or produced by the systems such as those of FIGS. 1, 2, 5, 6, 8, 11 and 12. Although, it is understood that the above are merely a few illustrative examples to which the disclosed subject matter is not limited. It is understood that the disclosed subject matter is not limited to the ordering of or number of actions illustrated by technique 1300.

Block 1302 illustrates that, in one embodiment, a communications link, may be established between the web browser and the remote computing device, as described above. In various embodiments, this communications link may be established via or include a standard non-proprietary web protocol, as described above. In some embodiments, this standard non-proprietary web protocol may include a hypertext transport protocol (HTTP) or its variants (e.g., HTTPS, etc.), as described above. In various embodiments, establishing may include establishing one or more Hypertext Markup Language (HTML) Web Socket interfaces, as described above. In various embodiments, one or more of the action(s) illustrated by this Block may be performed by the apparatuses or systems of FIGS. 1, 2, 5, 6, 8, 11 and 12, the non-proprietary communications manager 502 of FIG. 5, of the web browser 228 of FIGS. 2, 6, 8, 11 and 12, as described above.

Block 1304 illustrates that, in one embodiment, at least a graphical human interface output from the remote computing device may be received, as described above. In various embodiments, this GHI output may be received via the standard non-proprietary web protocol (e.g., HTTP, etc.), as described above. In one embodiment, receiving may include receiving a binary image of the graphical human interface produced by the remote computing device, as described above. In another embodiment, receiving may include receiving both a stream of images of the graphical human interface output from the remote computing device, and receiving an audio stream of the audio human interface output from the remote computing device, as described above. In yet another embodiment, receiving may include both receiving, via the standard non-proprietary web protocol (e.g., HTTP, etc.), the graphical human interface output from the remote computing device, and receiving, via a proprietary web protocol (e.g., a non-HTTP protocol, etc.), a non-graphical computer-human interface (HCI) output from the remote computing device, as described above. In some embodiments, receiving may include receiving via a Hypertext Markup Language (HTML) Web Socket interface, as described above. In various embodiments, receiving may include receiving the graphical human interface output via the bi-directional communications link, as described above. In various embodiments, one or more of the action(s) illustrated by this Block may be performed by the apparatuses or systems of FIGS. 1, 2, 5, 6, 8, 11 and 12, the non-proprietary communications manager 502 of FIG. 5, of the web browser 228 of FIGS. 2, 6, 8, 11 and 12, as described above.

Block 1306 illustrates that, in one embodiment, the graphical human interface output from the remote computing device may be displayed within a display area defined by a standard non-proprietary web element (e.g., a HTML web element, etc.), as described above. In some embodiments, the HTML web element may be interpreted by the web browser, as described above. In various embodiments, the Hypertext Markup Language (HTML) web element includes a Canvas hypertext markup element, as described above. In another embodiment, the Hypertext Markup Language (HTML) web element includes a Video hypertext markup element, as described above. In various embodiments, one or more of the action(s) illustrated by this Block may be performed by the apparatuses or systems of FIGS. 1, 2, 5, 6, 8, 11 and 12, the hypertext renderer 506 of FIG. 5, of the web browser 228 of FIGS. 2, 6, 8, 11 and 12, as described above.

Block 1308 illustrates that, in one embodiment, at least one update to the graphical human interface output may be received from the remote computing device, as described above. In various embodiments, these updates may be received via the HTTP connection, as described above. In various embodiments, receiving may include receiving a binary difference image that includes an indication of the differences between the graphical human interface of the remote computing device at the time the graphical human interface update was transmitted from the remote computing device and either the binary image of the graphical human interface of the remote computer or a previous binary difference image, as described above. In another embodiment, receiving may include receiving additional portions of a video stream, as described above. In various embodiments, one or more of the action(s) illustrated by this Block may be performed by the apparatuses or systems of FIGS. 1, 2, 5, 6, 8, 11 and 12, the non-proprietary communications manager 502 of FIG. 5, of the web browser 228 of FIGS. 2, 6, 8, 11 and 12, as described above.

Block 1310 illustrates that, in one embodiment, the graphical human interface output displayed within the display area defined by the non-proprietary web element (e.g., an HTML web element, etc.) may be dynamically updated, as described above. In various embodiments, this updating may be based upon the received at least one update to the graphical human interface output, as described above. In some embodiments, updating may include redrawing, via a client-side script, at least a portion of the display area, defined by the HTML web element, based upon the received at least one update to the graphical human interface output, as described above. In various embodiments, one or more of the action(s) illustrated by this Block may be performed by the apparatuses or systems of FIGS. 1, 2, 5, 6, 8, 11 and 12, the hypertext renderer 506 of FIG. 5, of the web browser 228 of FIGS. 2, 6, 8, 11 and 12, as described above.

FIG. 14 is a flow chart of an example embodiment of a technique in accordance with the disclosed subject matter. In various embodiments, the technique 1400 may be used or produced by the systems such as those of FIGS. 1, 2, 5, 6, 8, 11 and 12. Although, it is understood that the above are merely a few illustrative examples to which the disclosed subject matter is not limited. It is understood that the disclosed subject matter is not limited to the ordering of or number of actions illustrated by technique 1400.

Block 1402 illustrates that, in one embodiment, a communications link, may be established between the web browser and the remote computing device, as described above. In various embodiments, this communications link may be established via or include a standard non-proprietary web protocol, as described above. In some embodiments, this standard non-proprietary web protocol may include a hypertext transport protocol (HTTP) or its variants (e.g., HTTPS, etc.), as described above. In various embodiments, establishing may include establishing one or more Hypertext Markup Language (HTML) Web Socket interfaces, as described above. In some embodiments, establishing may include establishing a communication link comprises establishing a bi-directional communications link, as described above. In various embodiments, one or more of the action(s) illustrated by this Block may be performed by the apparatuses or systems of FIGS. 1, 2, 5, 6, 8, 11 and 12, the non-proprietary communications manager 502 of FIG. 5, of the web browser 228 of FIGS. 2, 6, 8, 11 and 12, as described above.

Block 1404 illustrates that, in one embodiment, at least a graphical human interface output from the remote computing device may be received, as described above. In various embodiments, this GHI output may be received via the standard non-proprietary web protocol (e.g., HTTP, etc.), as described above. In various embodiments, receiving may include the actions described in reference to Blocks 1306 and 1310 of FIG. 13. In various embodiments, one or more of the action(s) illustrated by this Block may be performed by the apparatuses or systems of FIGS. 1, 2, 5, 6, 8, 11 and 12, the non-proprietary communications manager 502 of FIG. 5, of the web browser 228 of FIGS. 2, 6, 8, 11 and 12, as described above.

Block 1406 illustrates that, in one embodiment, input from the human interface device coupled with the local computing device may be detected by the web browser via a client-side script, as described above. In various embodiments, detecting may include detecting a mouse event, wherein the mouse event includes local mouse event coordinates indicating where, respective to a local human graphical interface of the local computing device, the mouse event occurred, as described above. In various embodiments, one or more of the action(s) illustrated by this Block may be performed by the apparatuses or systems of FIGS. 1, 2, 5, 6, 8, 11 and 12, the hypertext renderer 506 of FIG. 5, of the web browser 228 of FIGS. 2, 6, 8, 11 and 12, as described above.

Block 1408 illustrates that, in one embodiment, a determination may be made as to whether or not the input from the human interface device is associated with the HTML web element, as described above. In various embodiments, determining may include associating the display area defined by a Hypertext Markup Language (HTML) web element screen with the HTML web element, and determining if the human interface device input occurred while the associated display area is designated by an operating system executing the web browser to receive human interface device input, as described above. In various embodiments, one or more of the action(s) illustrated by this Block may be performed by the apparatuses or systems of FIGS. 1, 2, 5, 6, 8, 11 and 12, the hypertext renderer 506 of FIG. 5, of the web browser 228 of FIGS. 2, 6, 8, 11 and 12, as described above.

Block 1410 illustrates that, in one embodiment, the human interface device input may be transmitted to the remote computing device for processing by the remote computing device, as described above. In some embodiments, transmitting may occur via the communication link, as described above. In various embodiments, transmitting may include converting the local mouse event coordinates to remote mouse event coordinates indicating where, respective to the human graphical interface of the remote computing device, the mouse event occurred, replacing the local mouse event coordinates with the remote mouse event coordinates, and transmitting the mouse event to the remote computing device, as described above. In various embodiments, one or more of the action(s) illustrated by this Block may be performed by the apparatuses or systems of FIGS. 1, 2, 5, 6, 8, 11 and 12, the non-proprietary communications manager 502 and/or HID input handler 508 of FIG. 5, of the web browser 228 of FIGS. 2, 6, 8, 11 and 12, as described above.

Block 1412 illustrates that, in one embodiment, at least a second human interface device input may be detected via a web browser plug-in, as described above. Block 1414 illustrates that, in one embodiment, the second human interface device input may be transmitted to the remote computing device, as described above. In various embodiments, transmitting may include transmitting via the web browser plug-in. In another embodiment, transmitting may include transmitting via the HTTP communications link, as described above. In various embodiments, one or more of the action(s) illustrated by this Block may be performed by the apparatuses or systems of FIGS. 1, 2, 5, 6, 8, 11 and 12, the web browser outgoing plug-in 530 of FIG. 5, of the web browser 228 of FIGS. 2, 6, 8, 11 and 12, as described above.

Block 1412 illustrates that, in one embodiment, at least a second human interface device input may be detected via a web browser plug-in, as described above. Block 1414 illustrates that, in one embodiment, the second human interface device input may be transmitted to the remote computing device, as described above. In various embodiments, transmitting may include transmitting via the web browser plug-in. In another embodiment, transmitting may include transmitting via the HTTP communications link, as described above. In various embodiments, one or more of the action(s) illustrated by this Block may be performed by the apparatuses or systems of FIGS. 1, 2, 5, 6, 8, 11 and 12, the web browser outgoing plug-in 530 of FIG. 5, of the web browser 228 of FIGS. 2, 6, 8, 11 and 12, as described above.

Block 1416 illustrates that, in one embodiment, an imaging device may be provided to the remote computing device via a web browser plug-in, as described above. Block 1418 illustrates that, in one embodiment, an access request regarding the imaging device may be received from the remote computing device, as described above. Block 1420 illustrates that, in one embodiment, the results of the access request may be transmitted to the remote computing device, as described above. In various embodiments, one or more of the action(s) illustrated by this Block may be performed by the apparatuses or systems of FIGS. 1, 2, 5, 6, 8, 11 and 12, the web browser outgoing plug-in 530 of FIG. 5, of the web browser 228 of FIGS. 2, 6, 8, 11 and 12, as described above.

Block 1422 illustrates that, in one embodiment, at least a portion of a local file system may be provided to the remote computing device via a web browser plug-in, as described above. Block 1424 illustrates that, in one embodiment, an access request to the portion of a local file system may be received from the remote computing device, as described above. Block 1426 illustrates that, in one embodiment, the results of the access request may be transmitted to the remote computing device, as described above. In various embodiments, one or more of the action(s) illustrated by this Block may be performed by the apparatuses or systems of FIGS. 1, 2, 5, 6, 8, 11 and 12, the web browser outgoing plug-in 530 of FIG. 5, of the web browser 228 of FIGS. 2, 6, 8, 11 and 12, as described above.

Figure 1:
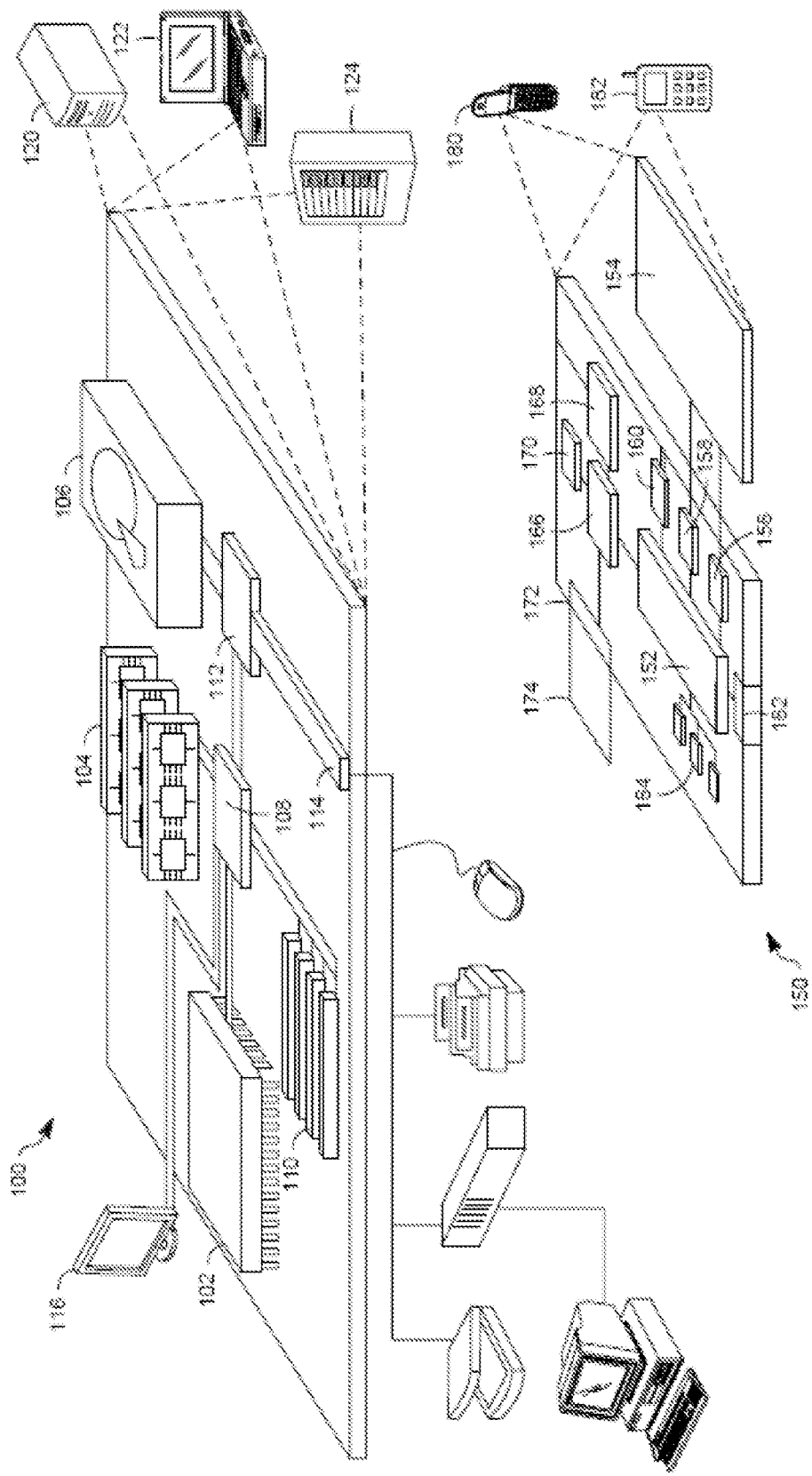
FIG. 1 is a block diagram of an example embodiment of a system in accordance with the disclosed subject matter.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of remotely controlling a remote computing device from a local computing device, the method comprising:
    executing a web browser at the local computing device to establish a communications link to control a remote desktop server (RDS) that is executing on the remote computing device;
    receiving, via a Hypertext Transfer Protocol (HTTP), at least a graphical human interface output from the remote computing device;
    displaying, within a display area defined by a Hypertext Markup Language (HTML) web element, wherein the HTML web element is interpreted by the web browser, the graphical human interface output from the remote computing device;
    receiving, from the remote computing device via the HTTP, at least one update to the graphical human interface output; and
    dynamically updating the graphical human interface output displayed within the display area defined by the HTML web element, wherein updating is based upon the received at least one update to the graphical human interface output.

2. The method of claim 1, wherein the Hypertext Markup Language (HTML) web element includes a Canvas hypertext markup element.

3. The method of claim 2, wherein receiving the graphical human interface output from the remote computing device comprises:
    receiving a binary image of the graphical human interface produced by the remote computing device; and
    wherein receiving at least one update to the graphical human interface output comprises:
        receiving a binary difference image that includes an indication of the differences between the graphical human interface of the remote computing device at the time the graphical human interface update was transmitted from the remote computing device and either the binary image of the graphical human interface of the remote computer or a previous binary difference image.

4. The method of claim 1, wherein the Hypertext Markup Language (HTML) web element includes a Video hypertext markup element.

5. The method of claim 4, wherein receiving at least the graphical human interface output from the remote computing device comprises:
    receiving a stream of images of the graphical human interface output from the remote computing device, and
    receiving an audio stream of the audio human interface output from the remote computing device.

6. The method of claim 1, wherein receiving at least the graphical human interface output from the remote computing device comprises:
    receiving, via the Hypertext Transfer Protocol (HTTP), the graphical human interface output from the remote computing device, and
    receiving, via a non-HTTP, a non-graphical computer-human interface (HCI) output from the remote computing device.

7. The method of claim 1, wherein dynamically updating the graphical human interface output displayed within the display area defined by the Hypertext Markup Language (HTML) web element comprises:
    redrawing, via a client-side script, at least a portion of the display area, defined by the HTML web element, based upon the received at least one update to the graphical human interface output.

8. The method of claim 1, wherein receiving via a Hypertext Transfer Protocol (HTTP) protocol comprises receiving via a Hypertext Markup Language (HTML) Web Socket interface.

9. The method of claim 1, wherein displaying the graphical human interface output from the remote computing device includes:
    displaying only the portions of the remote computing device's graphical human interface output associated with an application executed by the remote computing device.

10. The method of claim 1, wherein displaying the graphical human interface output from the remote computing device includes:
    not displaying the user interface of the web browser except for the display area defined by a Hypertext Markup Language (HTML) web element.

11. An apparatus comprising:
    a non-proprietary communications manager, the non-proprietary communications comprising hardware and/or firmware configured to:
        execute a web browser at local computing device to establish a communications link to control a remote desktop server (RDS) executing on the remote computing device;
        receive, via a Hypertext Transfer Protocol (HTTP), at least a graphical human interface output from the remote computing device, and
        receive, from the remote computing device via the HTTP, at least one update to the graphical human interface output; and
    a hypertext renderer configured to:
        display, within a display area defined by a Hypertext Markup Language (HTML) web element wherein the HTML web element is interpreted by the hypertext renderer, the graphical human interface output from the remote computing device, and
        dynamically update the graphical human interface output displayed within the display area defined by the HTML web element, wherein updating is based upon the received at least one update to the graphical human interface output.

12. The apparatus of claim 11, wherein the non-proprietary communications manager is configured to:
    establish a bi-directional communication link, via the Hypertext Transfer Protocol (HTTP), between the apparatus and the remote desktop server executing on the remote computing device.

13. The apparatus of claim 11, wherein the Hypertext Markup Language (HTML) web element includes a Canvas hypertext markup element.

14. The apparatus of claim 13, wherein the non-proprietary communications manager is configured to:
receive an initial binary image of the graphical human interface produced by the remote computing device, and
receive a binary difference image that includes an indication of the differences between the graphical human interface of the remote computer at the time the graphical human interface update was transmitted from the remote computing device and either the binary image of the graphical human interface of the remote computer or a previous binary difference image;
wherein the apparatus includes a graphical human interface engine configured to:
generate a current remote graphical human interface image based upon the initial binary image and the binary difference image; and
wherein the hypertext renderer is configured to:
dynamically update the graphical human interface output displayed within the display area defined by the HTML web element with the current remote graphical human interface image.

15. The apparatus of claim 11, wherein the Hypertext Markup Language (HTML) web element includes a Video hypertext markup element.

16. The apparatus of claim 15, wherein the non-proprietary communications manager is configured to:
receive a stream of images of the graphical human interface output from the remote computing device;
receive an audio stream of the audio human interface output from the remote computing device; and
wherein the stream of images and the audio stream are included in a video stream.

17. The apparatus of claim 11, further comprising:
an incoming plug-in configured to receive a non-graphical computer-human interface output from the remote computing device.

18. The apparatus of claim 11, wherein the hypertext renderer is configured to:
redraw, via a client-side script, at least a portion of the display area, defined by the HTML web element, based upon the received at least one update to the graphical human interface output.

19. The apparatus of claim 11, wherein the non-proprietary communications manager is configured to:
utilize a Hypertext Markup Language (HTML) Web Socket interface to communicate with the remote computing device.

20. The apparatus of claim 11, wherein the non-proprietary communications manager configured to execute a web browser at the local computing device to establish a communications link to control a remote desktop server (RDS) executing on the remote computing device is further configured to establish a remote desktop session by directing the web browser to a web page provided by the RDS.

21. The apparatus of claim 20, wherein the non-proprietary communications manager configured to execute a web browser at the local computing device to establish a communications link to control a remote desktop server (RDS) executing on the remote computing device is further configured to:
once the remote desktop session is established, establish one or more Web Sockets that provide for two-way full-duplex communications channels, each over a single Transmission Control Protocol (TCP) socket.

22. A computer program product for remotely controlling a remote computing device from a local computing device, the computer program product being tangibly embodied on a non-transitory computer-readable medium and including executable code that, when executed, is configured to cause the local computing device to:
execute a web browser at the local computing device to establish a communications link to control a remote desktop server (RDS) executing on the remote computing device;
receive, via a Hypertext Transfer Protocol (HTTP), at least a graphical human interface output from the remote computing device;
display, within a display area defined by a Hypertext Markup Language (HTML) web element wherein the HTML web element is interpreted by the web browser, the graphical human interface output from the remote computing device;
receive, from the remote computing device via the HTTP, at least one update to the graphical human interface output; and
dynamically update the graphical human interface output displayed within the display area defined by the HTML web element, wherein updating is based upon the received at least one update to the graphical human interface output.

23. The method of claim 1, wherein executing a web browser at the local computing device to establish a communications link to control a remote desktop server (RDS) that is executing on the remote computing device includes establishing a remote desktop session by directing the web browser to a web page provided by the RDS.

24. The method of claim 23, wherein executing a web browser at the local computing device to establish a communications link to control a remote desktop server (RDS) includes:
once the remote desktop session is established, establishing of one or more Web Sockets that provide for two-way full-duplex communications channels, each over a single Transmission Control Protocol (TCP) socket.

25. The computer program product of claim 22, wherein the executable code when executed causes the local computing device to establish a remote desktop session by directing the web browser to a web page provided by the RDS.

26. The computer program product of claim 25, wherein the executable code when executed causes the local computing device, once the remote desktop session is established, to establish one or more Web Sockets that provide for two-way full-duplex communications channels, each over a single Transmission Control Protocol (TCP) socket.

* * * * *